United States Patent
Kwon et al.

(10) Patent No.: US 10,142,767 B2
(45) Date of Patent: Nov. 27, 2018

(54) METHOD AND APPARATUS FOR TRANSMITTING DATA USING BLUETOOTH LOW ENERGY IN WIRELESS COMMUNICATION SYSTEM

(71) Applicant: LG ELECTRONICS INC., Seoul (KR)

(72) Inventors: Younghwan Kwon, Seoul (KR); Minsoo Lee, Seoul (KR); Hyeonjae Lee, Seoul (KR); Jangwoong Park, Seoul (KR); Jingu Choi, Seoul (KR); Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/305,820

(22) PCT Filed: Apr. 21, 2015

(86) PCT No.: PCT/KR2015/003989
§ 371 (c)(1),
(2) Date: Oct. 21, 2016

(87) PCT Pub. No.: WO2015/163680
PCT Pub. Date: Oct. 29, 2015

(65) Prior Publication Data
US 2017/0048655 A1 Feb. 16, 2017

Related U.S. Application Data

(60) Provisional application No. 61/982,290, filed on Apr. 21, 2014.

(51) Int. Cl.
*H04B 7/00* (2006.01)
*H04W 4/00* (2018.01)
(Continued)

(52) U.S. Cl.
CPC ............... *H04W 4/008* (2013.01); *H04L 1/00* (2013.01); *H04W 4/80* (2018.02); *Y02D 70/00* (2018.01);
(Continued)

(58) Field of Classification Search
CPC ............ H04W 4/008; H04W 4/80; H04L 1/00
(Continued)

(56) References Cited

U.S. PATENT DOCUMENTS

| | | | |
|---|---|---|---|
| 2002/0131376 A1* | 9/2002 | Wheatley, III | ........ H04W 52/24 370/328 |
| 2009/0004969 A1* | 1/2009 | Luong | ................... H04W 84/18 455/41.1 |

(Continued)

FOREIGN PATENT DOCUMENTS

| | | |
|---|---|---|
| JP | 2010-239181 A | 10/2010 |
| KR | 10-2014-0042534 A | 4/2014 |

OTHER PUBLICATIONS

Attribute Profile (ATT) and Generic Attribute Profile (GATT) [online]. Bluetooth Special Interest Group, Apr. 20, 2012.
(Continued)

*Primary Examiner* — Md Talukder
(74) *Attorney, Agent, or Firm* — Birch, Stewart, Kolasch & Birch, LLP

(57) ABSTRACT

The present invention is related to a method and an apparatus for transmitting and receiving data by using Bluetooth LE. A method and an apparatus according to the present invention comprises transmitting a first request message for requesting data to a second device; receiving a first response message including data in response to the first request message; if size of the data is equal to the maximum data transmission size, transmitting a second request message for transmitting additional data; and receiving a second response message including the additional data in response (Continued)

to the second request message, wherein the first request message or the second request message includes at least one of ID information, index information, or index range information of the data; and the first response message or the second response message includes at least one of length information or ID information.

5 Claims, 16 Drawing Sheets

(51) Int. Cl.
*H04L 1/00* (2006.01)
*H04W 4/80* (2018.01)
(52) U.S. Cl.
CPC .......... *Y02D 70/142* (2018.01); *Y02D 70/144* (2018.01); *Y02D 70/166* (2018.01); *Y02D 70/168* (2018.01)
(58) Field of Classification Search
USPC ...................................... 455/41.1, 41.2, 41.3
See application file for complete search history.

(56) References Cited

U.S. PATENT DOCUMENTS

| | | | |
|---|---|---|---|
| 2010/0184374 A1* | 7/2010 | Ohkita | H04M 1/7253 455/41.2 |
| 2011/0299492 A1* | 12/2011 | Lee | H04W 4/00 370/329 |
| 2012/0063449 A1 | 3/2012 | Frederic et al. | |
| 2013/0166642 A1* | 6/2013 | Polefko | G06F 19/3418 709/204 |
| 2013/0324147 A1* | 12/2013 | Ong | H05K 999/99 455/456.1 |
| 2014/0065960 A1* | 3/2014 | Gang | H04B 5/0031 455/41.1 |
| 2014/0094198 A1 | 4/2014 | Heo et al. | |
| 2014/0287689 A1* | 9/2014 | Kawashimo | H04B 5/02 455/41.2 |
| 2015/0341450 A1* | 11/2015 | Reunamaki | H04L 67/18 705/14.58 |
| 2016/0112096 A1* | 4/2016 | Zhao | G06F 3/0488 455/41.1 |
| 2016/0184635 A1* | 6/2016 | Kwon | H04W 76/10 455/41.2 |
| 2017/0223610 A1* | 8/2017 | Qi | H04W 48/10 |

OTHER PUBLICATIONS

Bluetooth 4.0 (BLE) Single Mode Stack 1.0 API Documentation Version (document) 1.3 [online]. Bluegiga Technologies, Feb. 24, 2012.

* cited by examiner

[FIG. 1]
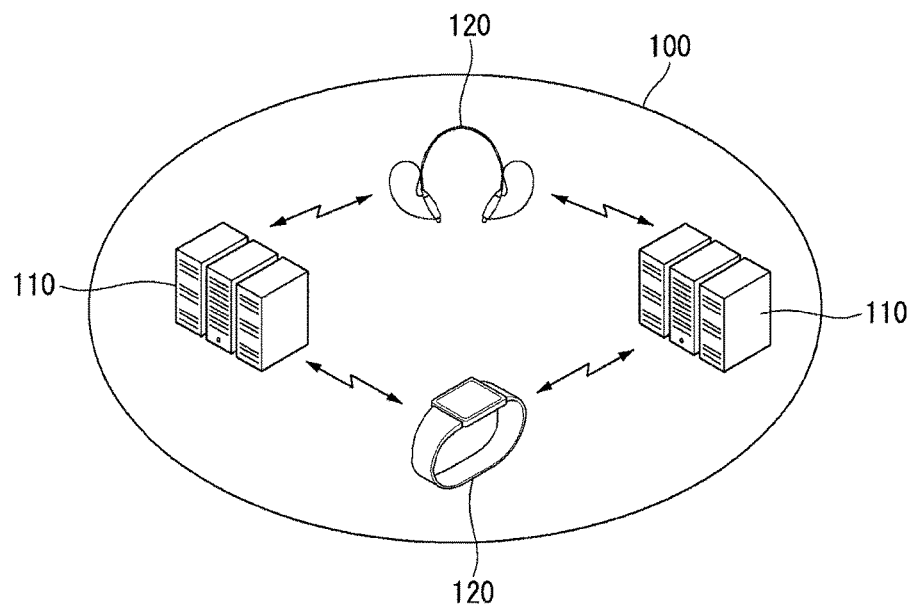

[FIG. 2]
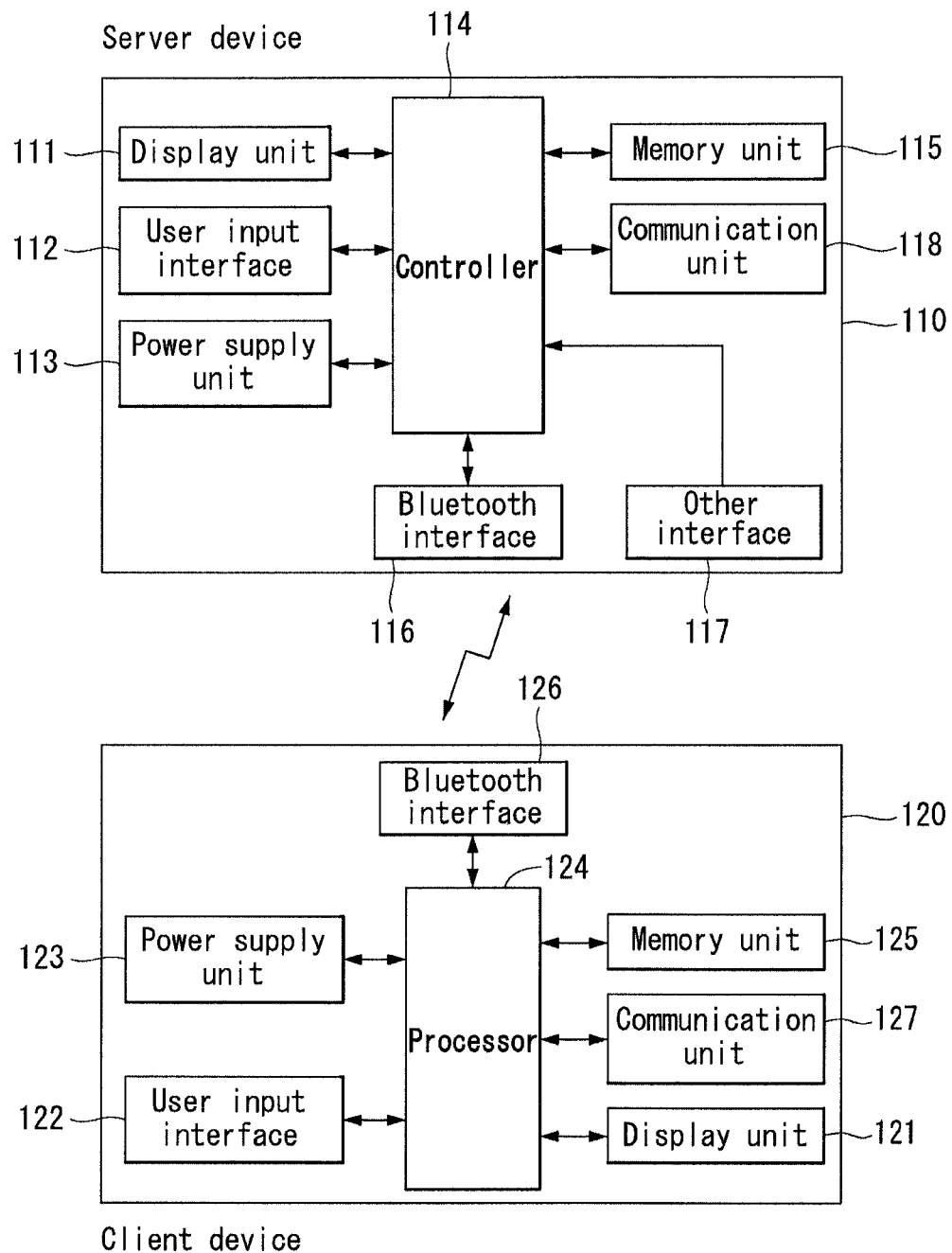

[FIG. 3]
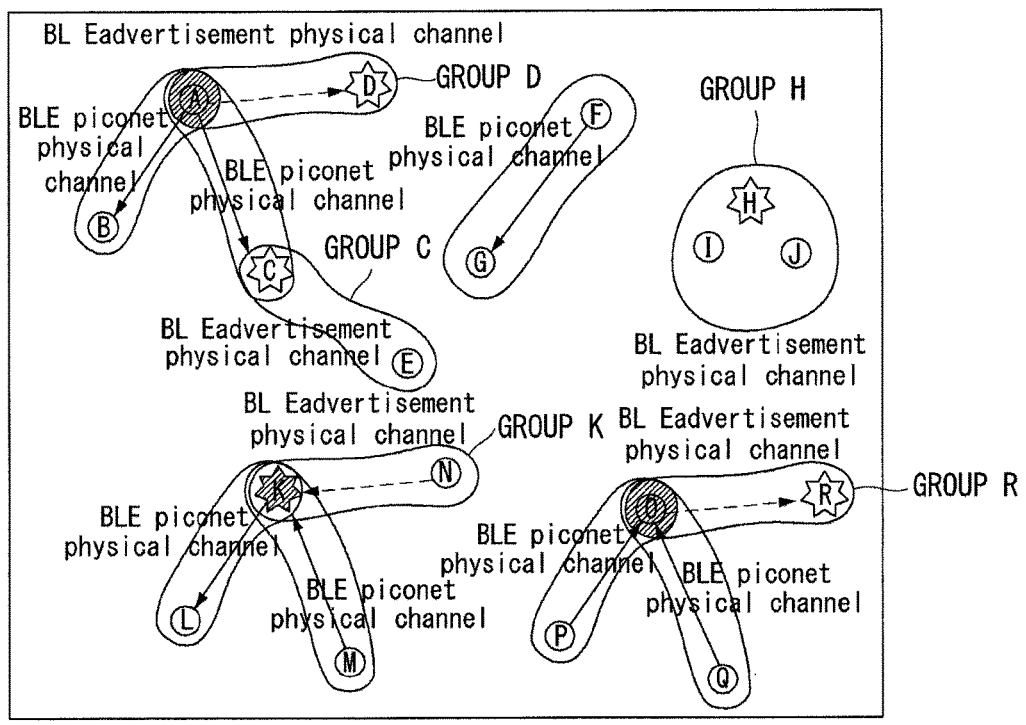

[FIG. 4]
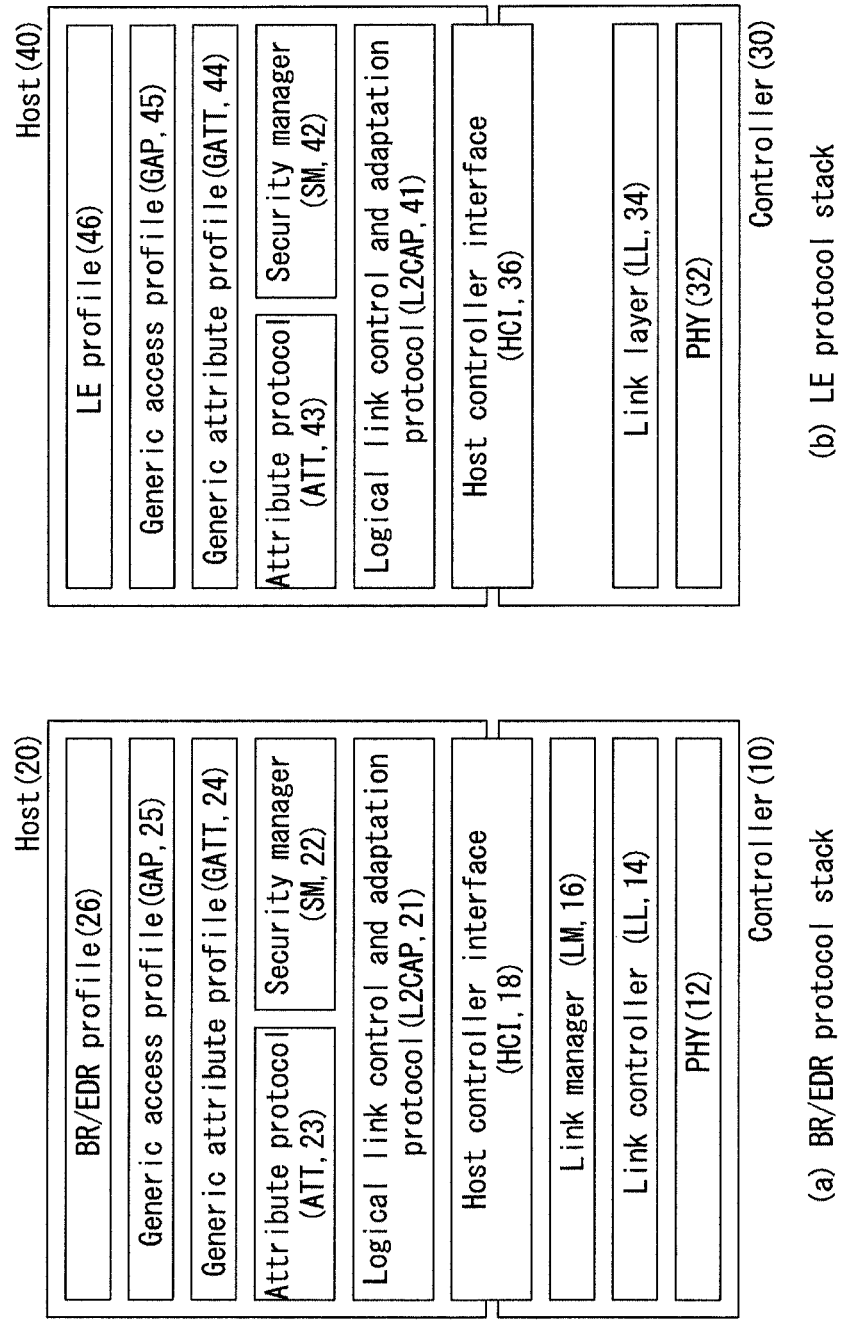

[FIG. 5]
| Attribute Handle | Attribute Type | Attribute Value | Attribute Permission |
(a) Logical Attribute Representation
| Opcode | Attribute Parameters | Authentication Signature |
(b) Attribute Protocol PDU
[FIG. 6]
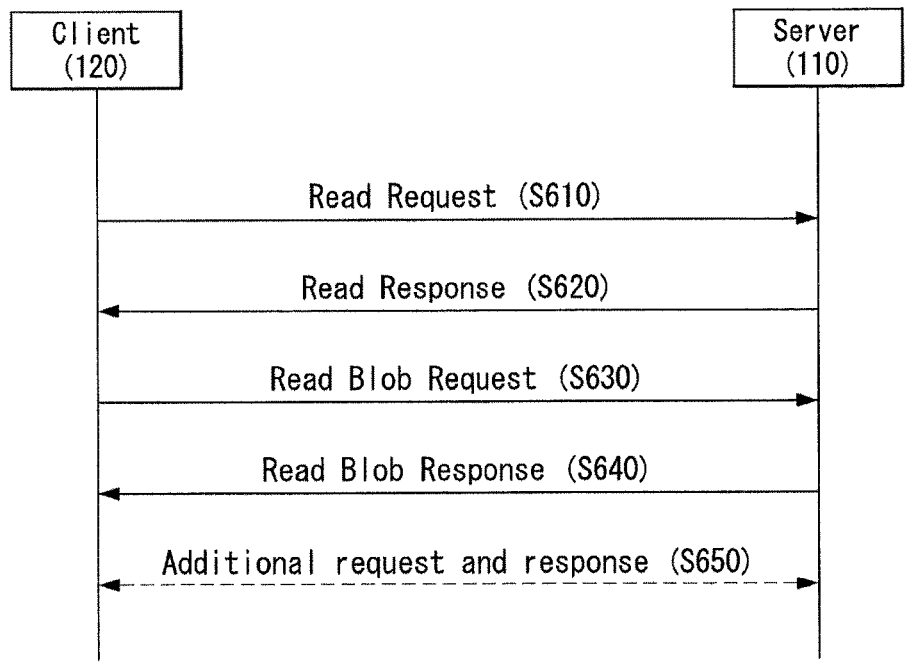

[FIG. 7]
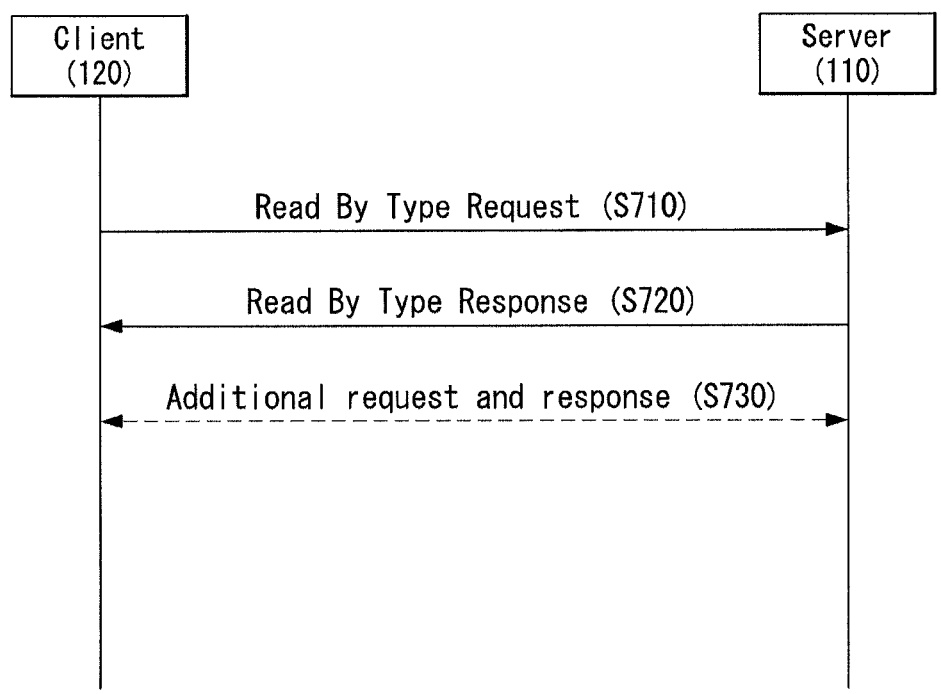

[FIG. 8]
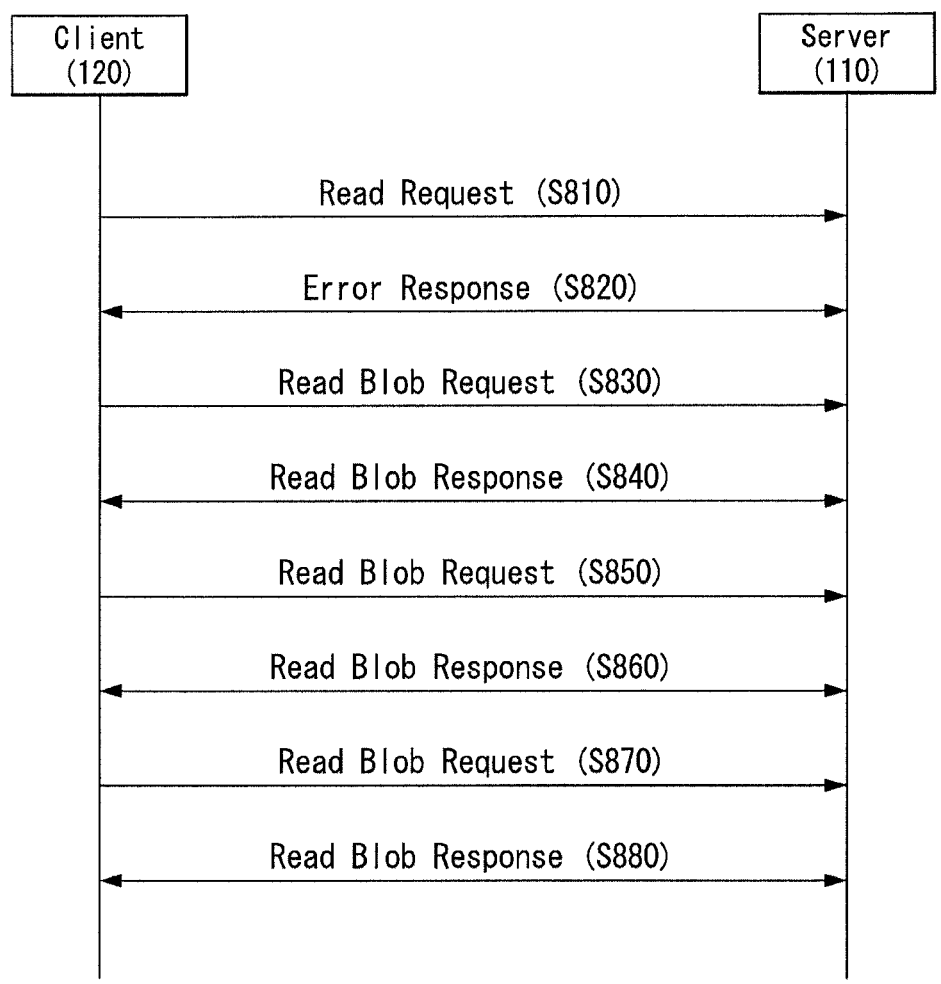

[FIG. 9]
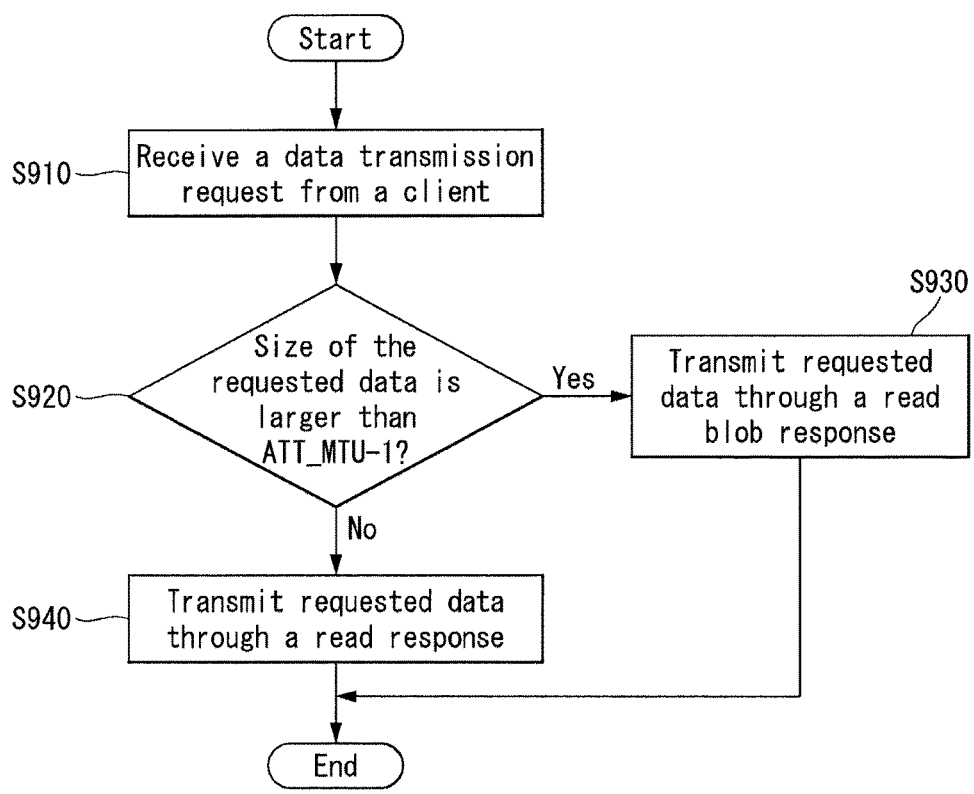

[FIG. 10]
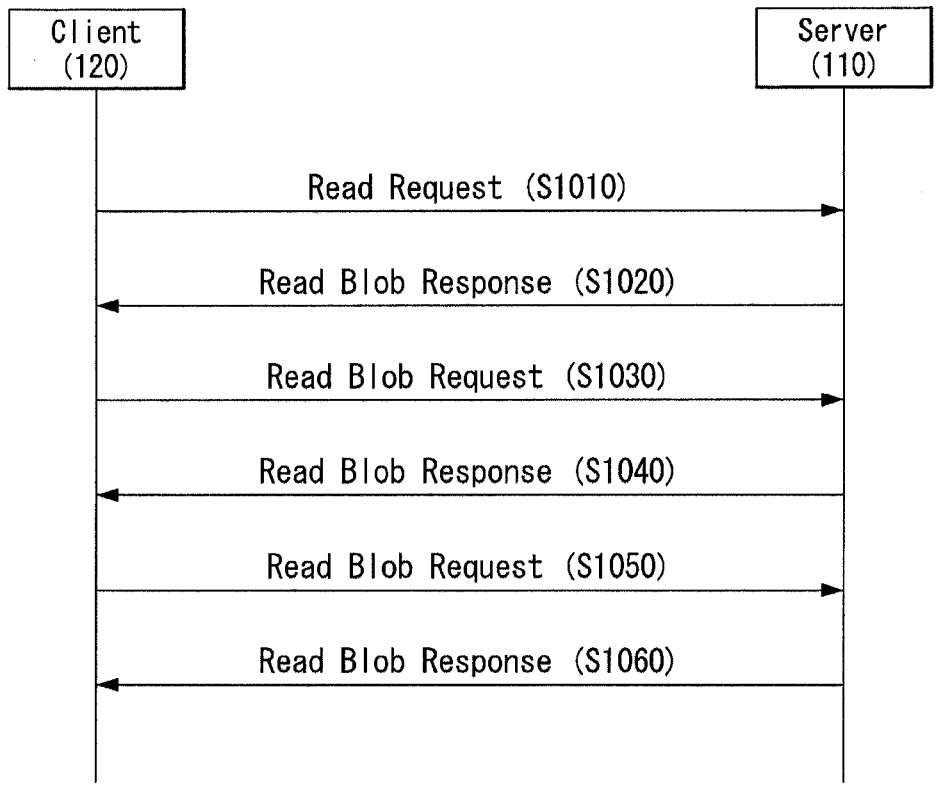
[FIG. 11]
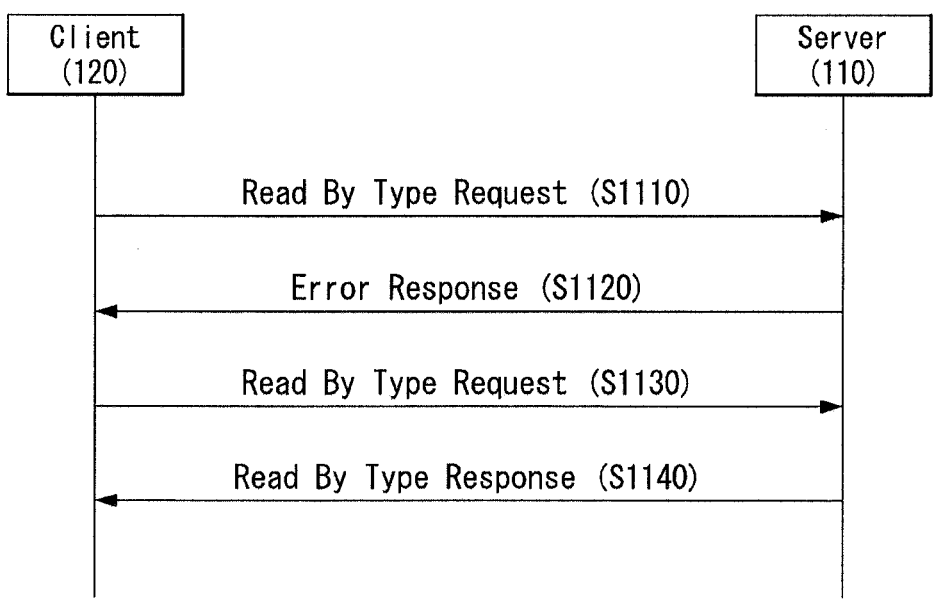

[FIG. 12]
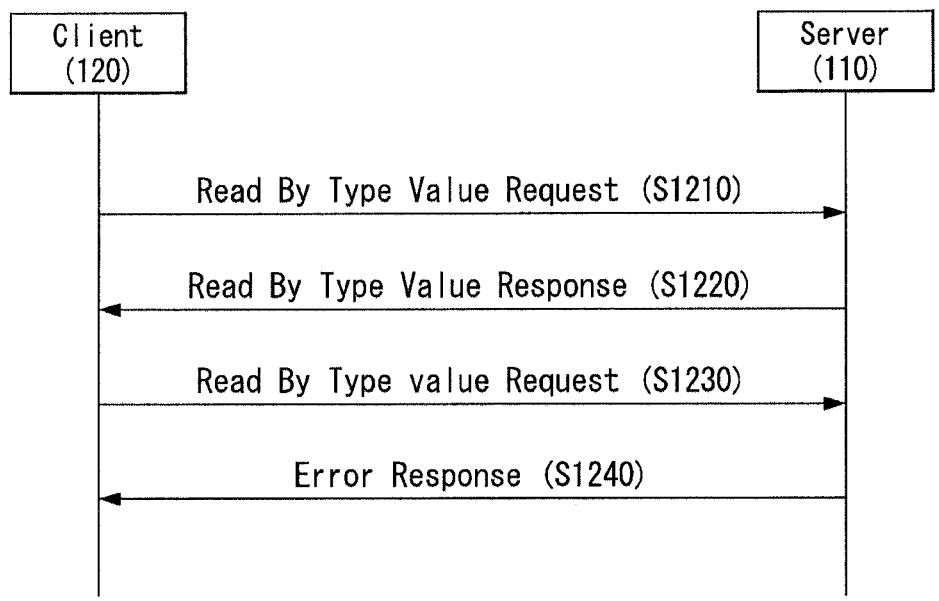
[FIG. 13]
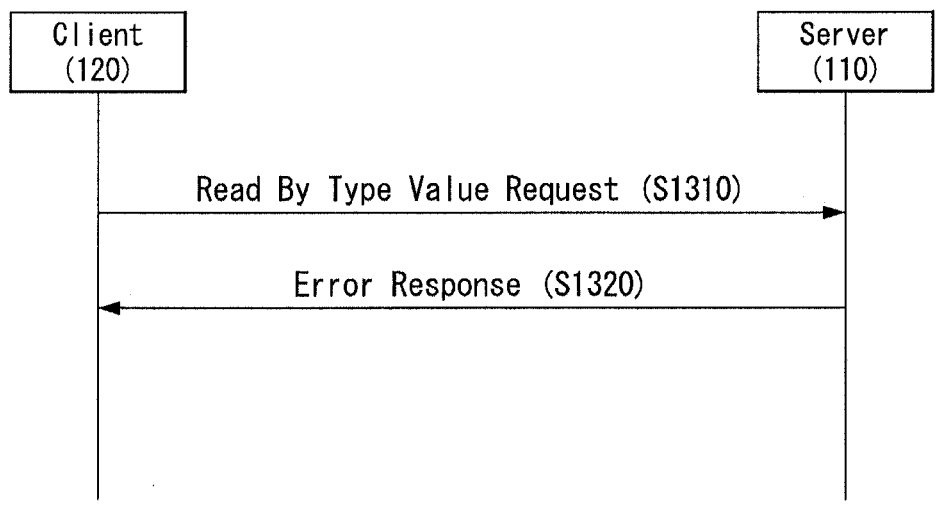

[FIG. 14]
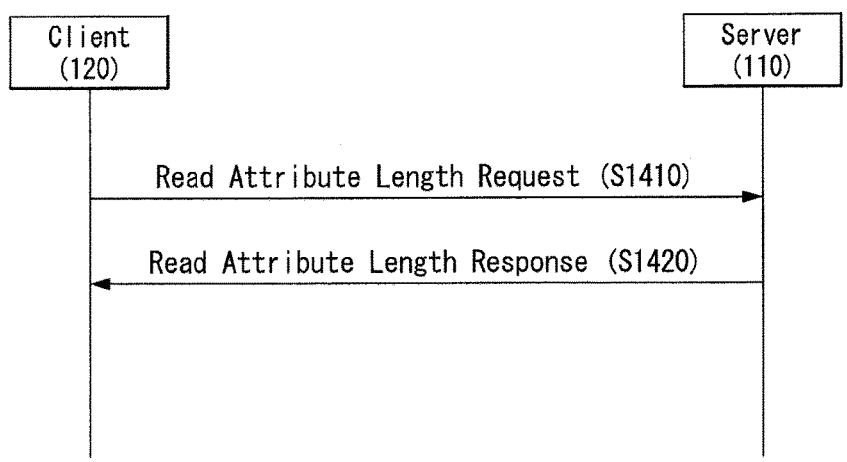
[FIG. 15]
| Attribute Handle | Attribute Type | Attribute Value | Attribute Value Length | Attribute Value Permission |
|---|---|---|---|---|
Logical Attribute Representation

[FIG. 16]
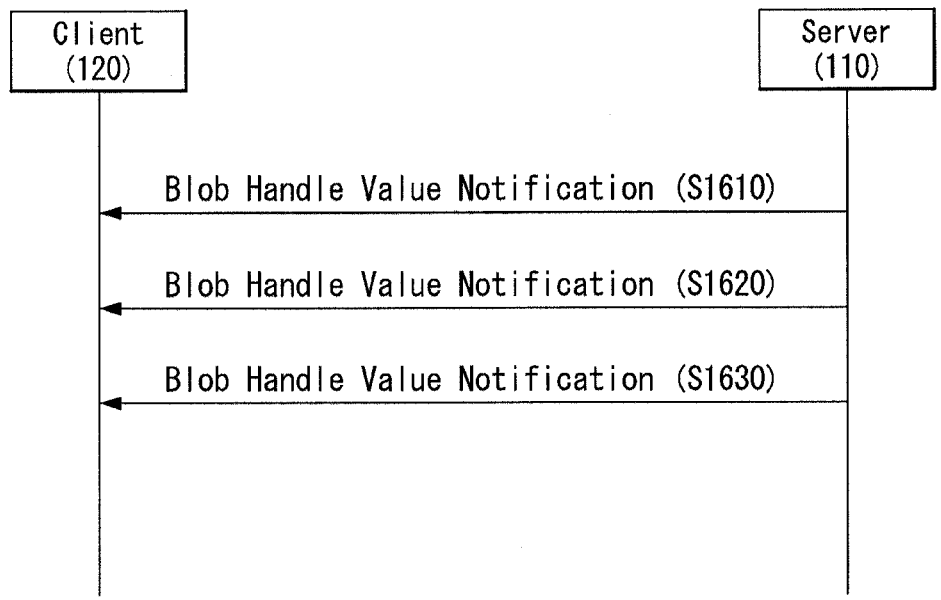
[FIG. 17]
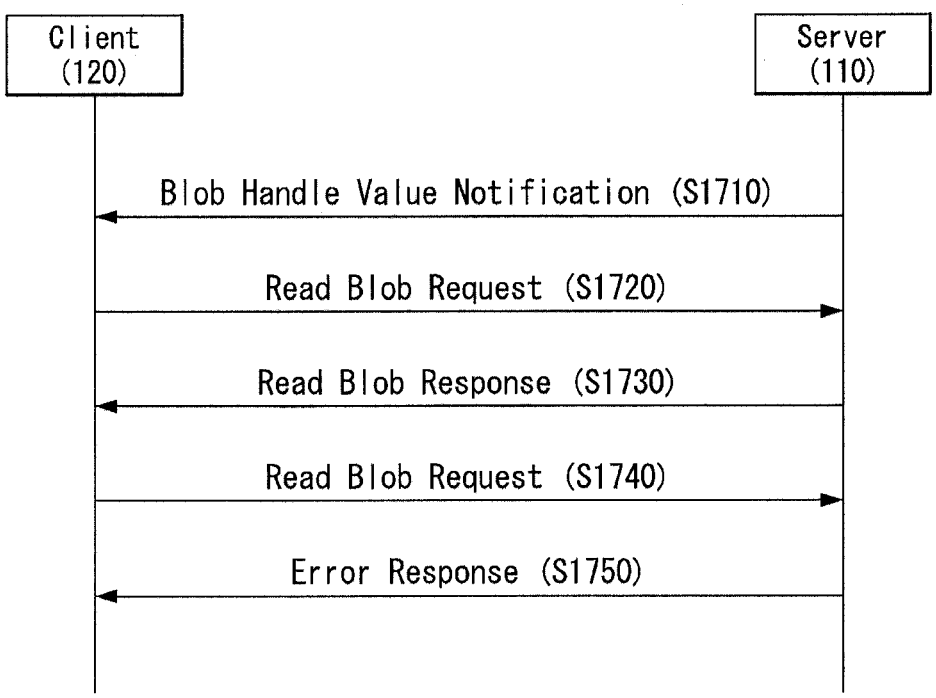

[FIG. 18]
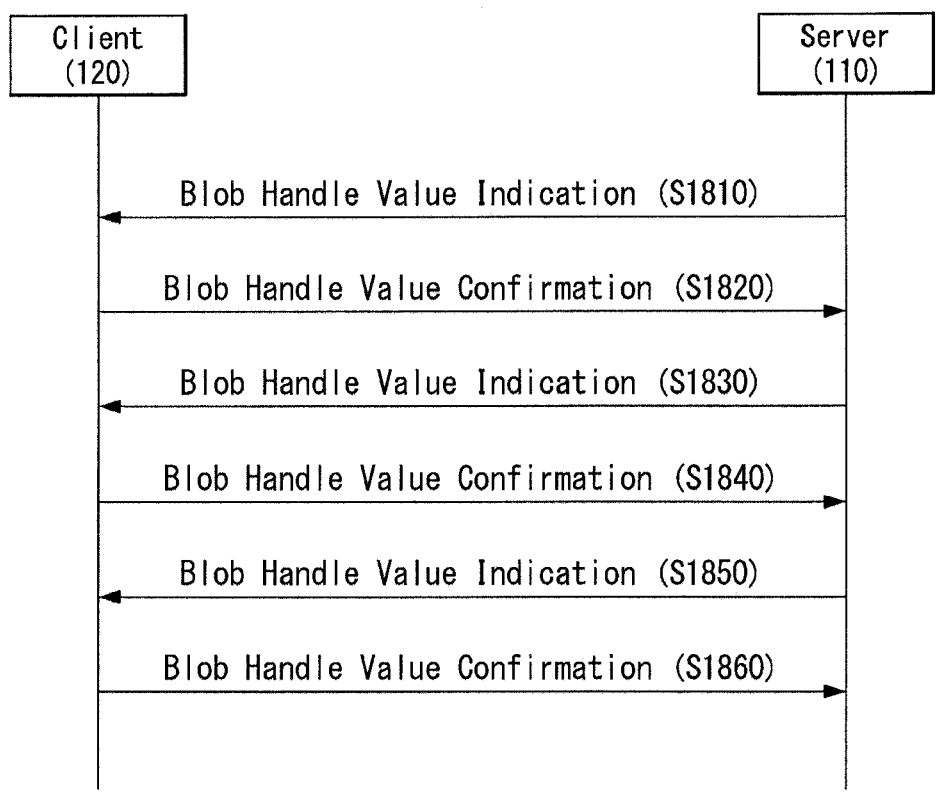

[FIG. 19]
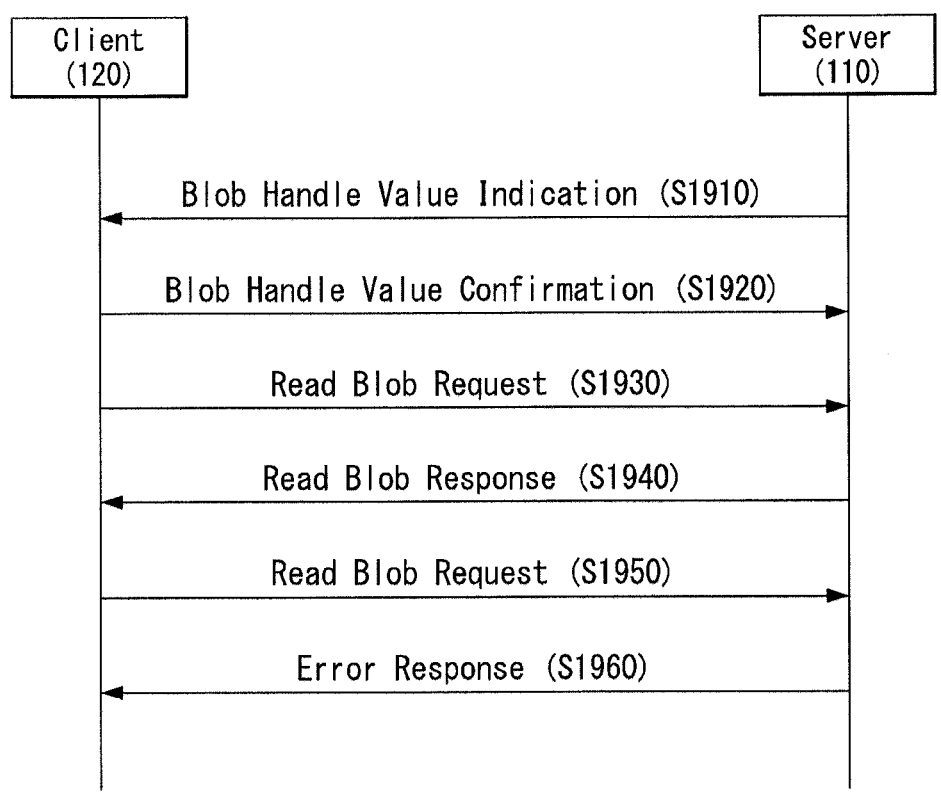

[FIG. 20]
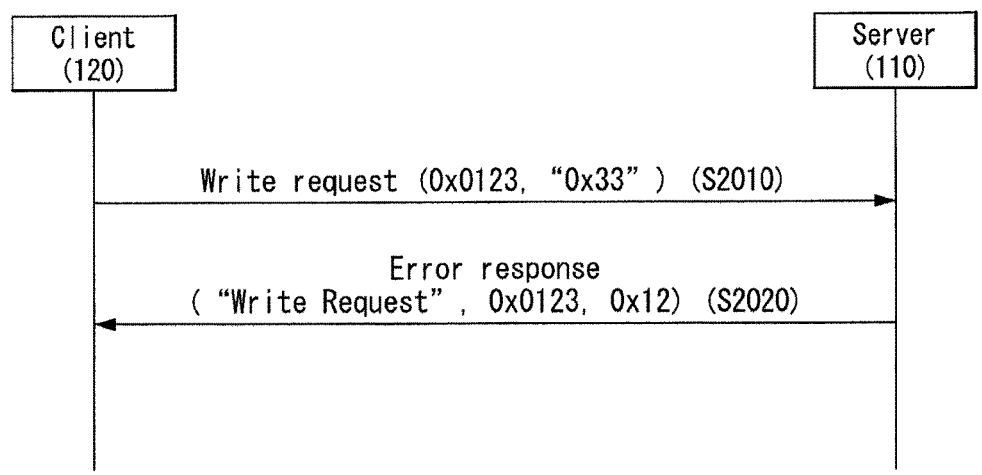
[FIG. 21]
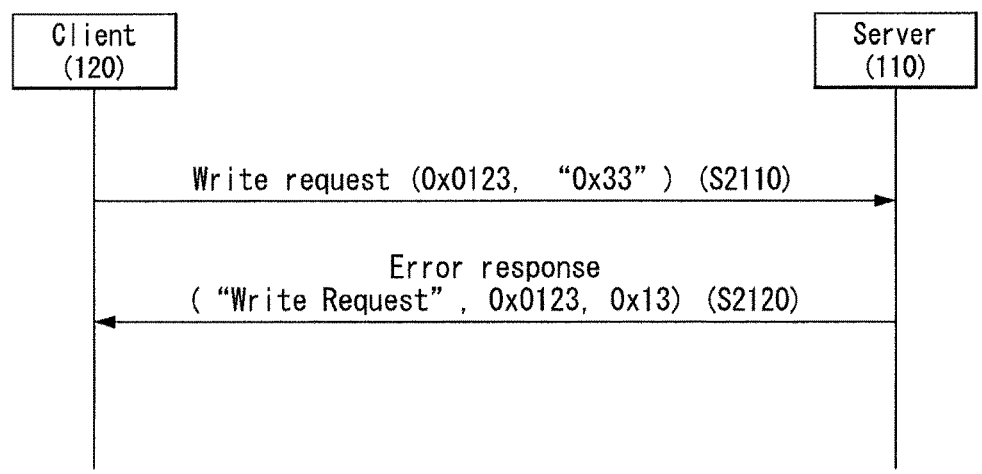

[FIG. 22]
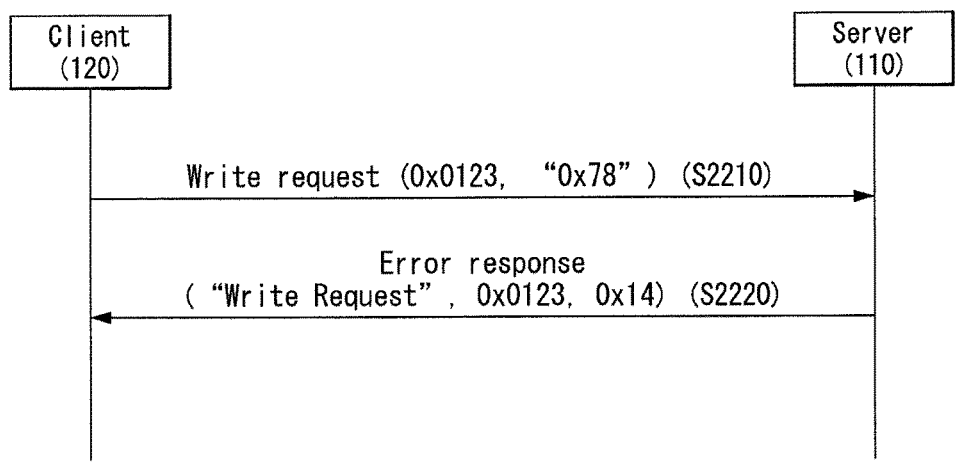
[FIG. 23]
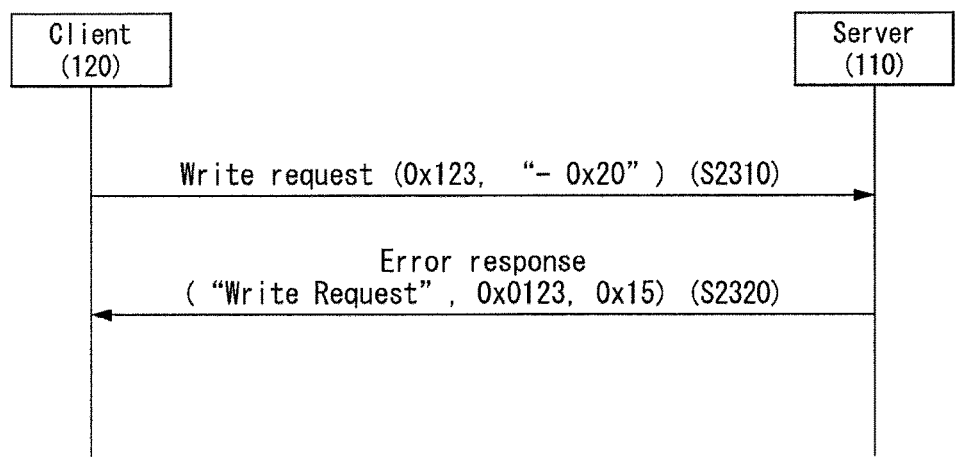

METHOD AND APPARATUS FOR TRANSMITTING DATA USING BLUETOOTH LOW ENERGY IN WIRELESS COMMUNICATION SYSTEM

CROSS REFERENCE TO RELATED APPLICATIONS

This application is the National Phase of PCT/KR2015/003989 filed on Apr. 21, 2015, which claims priority under 35 U.S.C. § 119(e) to U.S. Provisional Application No. 61/982,290 filed on Apr. 21, 2014, all of which are hereby expressly incorporated by reference into the present application.

TECHNICAL FIELD

The present invention relates to a method for transmitting and receiving data using Bluetooth Low Energy (BLE), a short range wireless communication technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An object of the present invention is to provide a method for transmitting and receiving data through Bluetooth communication.

An object of the present invention is to provide a method for transmitting and receiving large-size data through Bluetooth LE communication.

An object of the present invention is to define error messages for the errors that can occur during transmission and reception of data through Bluetooth LE communication.

An object of the present invention is to provide a method for finding a characteristic value through a specific characteristic or UUID (Universally Unique Identifier) stored in a server through Bluetooth LE communication.

An object of the present invention is to provide a method for providing data size or data length when data are transmitted and received through Bluetooth LE communication.

Technical Solution

To achieve the objectives above, the present invention provide a method and an apparatus for transmitting and receiving data through Bluetooth LE (Low Energy).

More specifically, a method for transmitting and receiving data through Bluetooth LE (Low Energy) according to one embodiment of the present invention comprises transmitting a first request message for requesting data to a second device; receiving a first response message including data in response to the first request message; if size of the data is equal to the maximum data transmission size, transmitting a second request message for transmitting additional data; and receiving a second response message including the additional data in response to the second request message, wherein the first request message or the second request message includes at least one of ID information, index information, or index range information of the data; and the first response message or the second response message includes at least one of length information or ID information.

According to the present invention, the data is length information.

According to the present invention, the first request message or the second request message includes an offset value, and the offset value represents a data transmission start position.

The present invention further comprises receiving an error message from the second device in case the data are plural; transmitting a third request message including an attribute value of the data; and receiving a third response message including the data in response to the third request message.

Also, the present invention comprises transmitting a request message for data transmission to a second device; receiving an error message in response to the request message from the second device; transmitting a first segment transmission request message for requesting segment transmission of data to the second device; receiving a first segment transmission response message including part of the data in response to the segment transmission request message; in case part of the received data amounts to the maximum data transmission size, transmitting a second segment transmission request message for additional data transmission; and receiving a second segment transmission response message including the additional data in response to the second segment transmission request message, wherein the first segment transmission request message or the second request message includes at least one of ID information, index information, or index range information of the data; and the first segment transmission response message or the second segment transmission response message includes at least one of length information or ID information.

According to the present invention, the first segment transmission request message or the second segment transmission request message includes an offset value, and the offset value represents a data transmission start position.

Also, the present invention comprises transmitting a request message requesting the second device to store specific data; and receiving an error message in response to the request message, wherein the error message indicates that the specific data does not follow a data format, belong to a data type, or fall within a range; and the request message includes index information of a storage position.

The present invention provides an apparatus comprising a communication unit for transmitting and receiving a signal to and from the outside in a wired and/or wireless manner; and a controller functionally connected to the communication unit, wherein the controller transmits a first request message for requesting data from a second device, receives a first response message including data in response to the first request message, transmits a second request message for additional data transmission if the data amounts to the maximum data transmission size, and receives a second response message including the additional data in response to the second request message, wherein the first request message or the second request message includes at least one of ID information, index information, or index range information of the data; and the first response message or the second response message includes at least one of length information or ID information.

According to the present invention, the data is length information.

According to the present invention, the first request message or the second request message includes an offset value, and the offset value represents a data transmission start position.

The controller according to present invention receives an error message from the second device in case the data are plural; transmits a third request message including an attribute value of the data; and receives a third response message including the data in response to the third request message.

The present invention provides an apparatus comprising a communication unit for transmitting and receiving a signal to and from the outside in a wired and/or wireless manner; and a controller functionally connected to the communication unit, wherein the controller transmits a request message for transmitting data to a second device, receives an error message in response to the request message from the second device, transmits a first segment transmission request message for requesting segment transmission of data to the second device, receives a first segment transmission response message including part of the data in response to the segment transmission request message, transmits a second segment transmission request message for transmitting additional data in case part of the received data amounts to the maximum data transmission size, and receives a second segment transmission response message including the additional data in response to the second segment transmission request message, wherein the first segment transmission request message or the second request message includes at least one of ID information, index information, or index range information of the data; and the first segment transmission response message or the second segment transmission response message includes at least one of length information or ID information.

According to the present invention, the first segment transmission request message or the second segment transmission request message includes an offset value, and the offset value represents a data transmission start position.

The present invention provides an apparatus comprising a communication unit for transmitting and receiving a signal to and from the outside in a wired and/or wireless manner; and a controller functionally connected to the communication unit, wherein the controller transmits a request message requesting the second device to store specific data and receives an error message in response to the request message, wherein the error message indicates that the specific data does not follow a data format, belong to a data type, or fall within a data range; and the request message includes index information of a storage position.

Advantageous Effects

According to a method and an apparatus for transmitting and receiving data by using Bluetooth LE according to one embodiment of the present invention, data size of the data transmitted from a server can be known accurately.

According to a method and an apparatus for transmitting and receiving data by using Bluetooth LE according to one embodiment of the present invention, an error message can be transmitted in case data which does not follow a data type or fit to a data size are received.

According to a method and an apparatus for transmitting and receiving data by using Bluetooth LE according to one embodiment of the present invention, data can be obtained through a specific attribute value or UUID (Universal Unique Identifier) value from a server.

According to a method and an apparatus for transmitting and receiving data by using Bluetooth LE according to one embodiment of the present invention, data can be received accurately from a server through a specific attribute value or UUID (Universal Unique Identifier) value.

BRIEF DESCRIPTION OF THE DRAWINGS

FIG. 1 is a schematic view illustrating an example of a wireless communication system using a Bluetooth low energy technology proposed in this specification.

FIG. 2 illustrates one example of an internal block diagram of a device in which methods proposed in this specification can be implemented.

FIG. 3 is a view illustrating an example of a Bluetooth low energy topology.

FIG. 4 is a view illustrating an example of a Bluetooth communication architecture proposed in this specification.

FIG. 5 illustrates one example of an attribute structure of Bluetooth LE and a PDU structure for providing an attribute value.

FIG. 6 is a flow diagram illustrating one example of a method for obtaining large data (larger than Attribute protocol (ATT) Maximum Transmission Unit (MTU) 1 (ATT_MTU-1)) stored in a server by using Bluetooth Low Energy (BLE).

FIG. 7 is a flow diagram illustrating one example of a method for obtaining data (smaller than ATT_MTU-1) stored in a server by using Bluetooth LE.

FIG. 8 is a flow diagram illustrating one example of a method for receiving data from a server by transmitting an error message according to data size, proposed in this specification.

FIG. 9 illustrates one example of a method for transmitting data through a different response message according to the size of requested data, proposed in this specification.

FIG. 10 illustrates another example of a method for transmitting data through a different response message according to the size of requested data, proposed in this specification.

FIG. 11 is a flow diagram illustrating another example of a method for obtaining data stored in a server, proposed in this specification.

FIG. 12 is a flow diagram illustrating one example of a method for receiving a characteristic or UUID stored in a server, proposed in this specification.

FIG. 13 is a flow diagram illustrating one example of a method for transmitting an error message in case requested data does not exist, proposed in this specification.

FIGS. 14 and 15 illustrate a method for receiving data size or length information stored in a server or an attribute structure, proposed in this specification.

FIG. 16 is a flow diagram illustrating one example of a method for notifying a client of data stored in a server, proposed in this specification.

FIG. 17 is a flow diagram illustrating another example of a method for notifying a client of data stored in a server, proposed in this specification.

FIG. 18 is a flow diagram illustrating one example of a method for indicating data stored in a server to a client, proposed in this specification.

FIG. 19 is a flow diagram illustrating another example of a method for indicating data stored in a server to a client, proposed in this specification.

FIGS. 20 to 23 are flow diagrams illustrating one example of an error occurring when data are stored in a server, proposed in this specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Electronic devices in this document may include a cellular phone, smartphone, laptop computer, digital broadcasting terminal, personal digital assistants (PDA), portable multimedia player (PMP), navigation terminal, and temperature/barometer/biometric data sensor; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame. A wireless communication interface and a wireless communication means are assigned or used interchangeably by taking into account only the convenience of writing the specification of the present invention and do not have individual implications or provide individual roles that can be distinguished from each other.

FIG. 1 is a schematic view illustrating an example of a wireless communication system using a Bluetooth low energy technology proposed in this specification.

A wireless communication system 100 includes at least one server device 110 and at least one client device 120.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 110 may operate as a client device in a relationship with other device, and the client device may operate as a server device in a relationship with other device. That is, in the BLE communication system, any one device may operate as a server device or a client device, or may operate as both a server device and a client device if necessary.

The server device 110 can be denoted as a data service device, master device, master, server, conductor, host device, audio source device, gateway, or first device; and the client device can be denoted as a slave device, slave, client, member, sensor device, sink device, audio sink device, or second device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 5.

Also, the wireless communication system may configure personal area networking (PAN) through the Bluetooth technology. For example, in the wireless communication system, a private piconet may be established between devices to quickly and safely exchange files, documents, and the like.

A BLE device (or apparatus) can operate to support various Bluetooth-related protocols, profiles, and processes.

An electronic device supporting the BLE also supports various wireless communication interfaces such as Wi-Fi, Bluetooth BR/EDR, and NFC.

Since it is difficult for various wireless communication interfaces to predict when a connection to a corresponding device is established, most electronic devices maintain a plurality of wireless communication interfaces to be at a wake-up state.

These communication interfaces have a technical solution for minimizing standby power within idle time and also exhibit excellent energy efficiency due to the technical solution. However, it is highly restrictive to maintain all of wireless communication interfaces that can be newly devised with technological development to be at a wake-up state all the time, which can be more serious for battery-limited devices.

To overcome this situation, the present invention proposed a method which uses BLE as a wake-up interface and wakes up other wireless communication interfaces only upon a request being made.

FIG. 2 illustrates one example of an internal block diagram of a device in which methods proposed in this specification can be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As described above, BLE has a small duty cycle and can considerably reduce power consumption through a low data transmission rate; thus the power supply unit can provide power required to operate the respective constituting elements even with small output power (less than 10 mW (10 dBm)).

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device O and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time FIG. 4 is a view illustrating an example of a Bluetooth communication architecture proposed in this specification.

With reference to FIG. 4, FIG. 4(a) illustrates one example of protocol stack of Bluetooth BR (Basic Rate)/EDR (Enhanced Data Rate), and FIG. 4(b) illustrates one example of a protocol stack of Bluetooth LE (Low Energy).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP 21), security manager (SM 22), attribute protocol (ATT 23), generic attribute profile (GATT 24), generic access profile (GAP 25), and BR/EDR profile 26.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM 22) is a protocol used to authenticate devices and perform key distribution.

The generic attribute profile (GATT) 24 may operate as a protocol how the attribute protocol 23 is used in configuring services. For example, the generic attribute profile 24 may operate how ATT attributes are grouped together with services, and operate to describe features associated with services.

Thus, the GATT 24 and the ATT 23 may use features in order to describe status and services of a device and describe how the features are related and used.

The attribute protocol 23 and BR/EDR profile 26 define a service profile for using Bluetooth BR/EDR and an application protocol for exchanging data; the generic access profile (GAP 25) defines a scheme for discovering and connecting a device; providing information for the user; and providing privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

Bluetooth LE uses three fixed channels: channels for signaling, security manager, and attribute protocol.

On the other hand, BR/EDR (Basic Rate/Enhanced Data Rate) uses a dynamic channel and supports protocol service multiplexer, retransmission, streaming mode, and so on.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: a request message refers to the message used by a client device to request specific information from a server device, and a response message refers to the message transmitted by the server device to the client device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46 has a dependency on the GATT and is used mainly for Bluetooth LE devices. For example, the LE profile 46 includes Battery, Time, FindMe, Proximity, Time, Object Delivery Service, and the like; specific contents of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

At this time, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional user data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates one example of an attribute structure of Bluetooth LE and a PDU structure for providing an attribute value.

FIG. 5(a) illustrates one example of constituting elements of the attribute described above; one attribute comprises four constituting elements as follows.

Attribute Handle: Address of Attribute

Attribute Value: Type of Attribute

Attribute Value: Value of Attribute

Attribute Permissions: Access Permission associated with Attribute

A server provides a service by using the attribute described above, and transmits data in the form of attribute protocol PUD as shown in FIG. 5(b).

Table 2 shows one example of attribute protocol PDU as shown in FIG. 5(b).

TABLE 2

| Name | Size (Octets) | Description |
|---|---|---|
| Attribute Opcode | 1 | The Attribute PDU operation code<br>bit7: Authentication Signature Flag<br>bit6: Command Flag<br>Bit5-0: Method |
| Attribute Parameter | 0 to (ATT_MTU-X) | The Attribute PDU parameters<br>X = 1 if Authentication Signature Flag of the Attribute Opcode is 0<br>X = 13 if Authentication Signature Flag of the Attribute Opcode is 1 |
| Authentication Signature | 0 or 12 | Optional authentication signature for the Attribute Opcode and Attribute Parameters |

As shown in Table 2 and FIG. 5(b), the attribute protocol PDU can be composed of an Opcode field, attribute parameters field and/or authentication signature field.

The attribute opcode includes information informing of which PDU the corresponding attribute protocol PDU corresponds to by using octet data.

Table 3 shows one example of the attribute opcode.

TABLE 3

| Attribute PDU Name | Attribute Opcode | Parameters |
|---|---|---|
| Error Response | 0x01 | Request Opcode in Error, Attribute Handle In Error, Error Code |
| Exchange MTU Request | 0x02 | Client Rx MTU |
| Exchange MTU Response | 0x03 | Server Rx MTU |
| Find Information Request | 0x04 | Starting Handle, Ending Handle, UUID |
| Find Information Response | 0x05 | Format, Information Data |
| Find by Type Value Request | 0x06 | Starting Handle, Ending Handle, Attribute Type, Attribute Value |
| Find by Type Value Response | 0x07 | Handles Information List |
| Read By Type Request | 0x08 | Starting Handle, Ending Handle, UUID |
| Read By Type Response | 0x09 | Length, Attribute Data List |
| Read Request | 0x0A | Attribute Handle |
| Read Response | 0x0B | Attribute Value |
| Read by Blob Request | 0x0C | Attribute Handle, Value Offset |
| Read by Blob Response | 0x0D | Part Attribute Value, Handle Set |
| Read Multiple Request | 0x0E | Value Set |
| Read Multiple Response | 0x0F | Starting Handle, Ending Handle, UUID |
| Read by Group Type Request | 0x10 | Length, Attribute Data List |
| Read by Group Type Response | 0x11 | Attribute Handle, Attribute Value |
| Write Request | 0x12 | — |
| Write Response | 0x13 | Attribute Handle, Attribute Value |
| Write Command | 0x52 | Attribute Handle, Attribute Value |
| Prepare Write Request | 0x16 | Attribute Handle, Value Offset, Part Attribute Value |

TABLE 3-continued

| Attribute PDU Name | Attribute Opcode | Parameters |
|---|---|---|
| Prepare Write Response | 0x17 | Attribute Handle, Value Offset, Part Attribute Value |
| Execute Write Request | 0x18 | Flags |
| Execute Write Response | 0x19 | — |
| Handle Value Notification | 0x1B | Attribute Handle, Attribute Value |
| Handle Value Indication | 0x1D | Attribute Handle, Attribute Value |
| Handle Value Confirmation | 0x1E | |
| Signed Write Command | 0xD2 | Attribute Handle, Attribute Value, Authentication Signature |

The attribute parameters include information to be delivered by an actual message and can have the following values.

Handle: index at which data is located
Value: value of the data
Data list: a list of various data values
Length: length of the data The authentication signature is an optional field, existing or not existing selectively; in the case of signed write command, the authentication signature can include signature information of 12 octets.

Through the attribute protocol PDU, a client can read the attribute handle value, attribute value, data list, or length stored in the server or store the aforementioned values in the server.

As described above, the present invention proposes error codes used for retrieving or storing data from a server or a method for retrieving a specific value correctly.

FIG. 6 is a flow diagram illustrating one example of a method for obtaining large data (larger than ATT_MTU-1) stored in a server by using Bluetooth LE.

With reference to FIG. 6, in case data are transmitted and received by using Bluetooth LE, data can be transmitted differently depending on the data size or length.

More specifically, a Bluetooth LE link is formed between a client 120 and a server 110 through the Bluetooth LE connection procedure.

Afterwards, the client 120 transmits a read request to the server 110 to read data (for example, attribute value) stored in the server 110 through the aforementioned attribute protocol S610.

At this time, the client 120 request data from the server 110 by including the handle value of the characteristic value to read in the read request.

The maximum data transmission size of the attribute protocol is ATT_MTU-1, and in case the data size of the data is larger than ATT_MTU-1, the client can only read the data up to the size of ATT_MTU-1.

The server 100 which has received the read request transmits the data to the client through a read response by finding the stored data on the basis of the handle value included in the read request S620.

At this time, the maximum size of the data that can be transmitted through the read response is ATT_MTU-1, and in case the data size of the data exceeds ATT_MTU-1, only the data up to the size of ATT_MTU-1 can be transmitted.

In case the client does not receive the whole data at one time through a read response because the data length of the data (for example, characteristic) varies, the client which has received data through the read response is unable to know whether additional data are present.

If the client 120 intends to read data of which the size exceeds ATT_MTU-1, the data can be read in segments, and to this purpose, the client 120 transmits a read blob request to the server 110, S630.

Since the read blob request includes not only the handle value of the characteristic that the client wants to read but also a characteristic offset used for reading data in segments, the data can be read from the characteristic offset.

The server 110 which has received the read blob request transmits the data corresponding to the data size of ATT_MTU-3 to the client 120 on the basis of the handle value and characteristic offset value by including the data in a read blob response S630.

Afterwards, in case there remains data to transmit, data can be received through an additional request and response S630.

However, in case the characteristic offset value is larger than the data size, or the data size of the data received through the read blob response is smaller than the ATT_MTU-3, an additional request may not be transmitted.

Or in case the client 120 receives an invalid offset response, an additional request may not be transmitted.

However, the method described above has a problem that the client can receive data in segments through a read blob request only if the client is informed of the data size of the data in advance. If not, the client can receive data only through a read request; thus it is not possible for the client to know whether the received data is only part of the whole data or whether there is additional data to receive.

To solve the problem above, the present invention proposes a method for transmitting information about existence of additional data at the time of transmitting a read response, data length, and so on.

FIG. 7 is a flow diagram illustrating one example of a method for obtaining data (smaller than ATT_MTU-1) stored in a server by using Bluetooth LE.

With reference to FIG. 7, the client can read a characteristic value stored in a server by using UUID of the characteristic.

More specifically, in case the client 120 is informed of the UUID of a specific characteristic, the client 120 transmits a read by type request to the server 110 to read data from the server 110 by using the UUID S710.

At this time, the read by type request can include the UUID value of a specific characteristic, starting handle value, and ending handle value.

For most cases, the starting handle value and the ending handle value correspond to the starting handle value and the ending handle value of a specific service.

The server 110 which has received the read by type request transmits the requested value to the client 120 through a read by type response S720.

At this time, the characteristic value having the UUID can take multiple values between the starting handle value and the ending handle value. Since the server 110 is unable to know the handle value of the characteristic, a plurality of characteristic values having the same UUID can be transmitted to the client 120.

Afterwards, in case there exist data that the client 120 wants to receive from the server 110, the client 120 can receive the data through an additional request and response S730.

In this method, since the read by type response can transmit data only as large as up to ATT_MTU-1, the read by type response may not include the characteristic value that the client 120 wants to receive.

Also, since the client 120 does not have handle information of the characteristic, the client 120 is unable to figure out to which characteristic the received value corresponds.

Therefore, the present invention proposes a method for receiving a handle value of a characteristic from the server.

FIG. 8 is a flow diagram illustrating one example of a method for receiving data from a server by transmitting an error message according to data size, proposed in this specification.

With reference to FIG. 8, in case data size of the data to read from a server is larger than the maximum transmission size of a read response, an error message is transmitted to perform segment transmission.

More specifically, in case the client 120 attempts to read data stored in the server 110, the client 120 transmits a read request to the server 110, S810.

At this time, the read request includes a handle value of the corresponding attribute. For example, if the client 120 intends to read the attribute value as shown in Table 4 below, the client 120 transmits a handle value of "0x0123" by including the handle value in the read request.

TABLE 4

| Attribute Handle | Attribute Type | Attribute Value | Attribute Permission |
|---|---|---|---|
| 0x0123 | Name | A Very Long Device Name Using a Long Attribute | |

The server 110 which has received the read request can find the requested data on the basis of the handle value. At this time, in case data size of the requested data is larger than the maximum transmission size of a read response, the server 110 transmits an error response to the client 120, S820.

Table 5 below shows one example of a data format of the error response.

TABLE 5

| Parameter | Size (octets) | Description |
|---|---|---|
| Attribute Opcode | 1 | 0x01 = Error Response |
| Request Opcode In Error | 1 | The Request that generated this error response |
| Attribute Handle In Error | 2 | The attribute Handle that generated this error response |
| Error Code | 1 | The reason why the request has generated an error response |

The error response can comprise attribute opcode, request opcode in error, attribute handle in error and/or error code.

The attribute opcode is 0x01 and indicates an error response. The request opcode in error represents the opcode of the request which has caused an error, and the attribute handle in error represents the attribute handle value of the request which has caused an error.

The error code indicates the source which has caused an error and can have one of the five values shown in the table below.

Table 6 shows one example of the error code value.

TABLE 6

| Name | Error Code | Description |
| --- | --- | --- |
| Invalid Handle | 0x01 | The Attribute Handle given was not valid on this server |
| Read Not Permitted | 0x02 | The attribute cannot be read |
| Write Not Permitted | 0x03 | The attribute cannot be written |
| Invalid PDU | 0x04 | The attribute PDU was invalid |
| Insufficient Authentication | 0x05 | The attribute requires authentication before it can be read or written |
| Request Not Supported | 0x06 | Attribute server does not support the request received from the client |
| Invalid Offset | 0x07 | Offset specified was past the end of the attribute |
| Insufficient Authorization | 0x08 | The attribute requires authorization before it can be read or write |
| Prepare Queue Full | 0x09 | Too many prepare writes have been queued |
| Attribute Not Found | 0x0A | No attribute found within the given attribute handle range |
| Attribute Not Long | 0x0B | The attribute cannot be read or written using the Read Blob Request |
| Insufficient Encryption Key Size | 0x0C | The Encryption Key Size Used for encryption this link is insufficient |
| Invalid Attribute Value Length | 0x0D | The attribute value length is invalid for the operation |
| Unlikely Error | 0x0E | The attribute request that was requested has encountered an error that was unlikely, and therefore could not be completed as requested |
| Insufficient Encryption | 0x0F | The attribute requires Encryption before it can be read or written |
| Unsupported Group Type | 0x10 | The attribute type is not a supported grouping attribute as defined by a higher layer specification |
| Insufficient Resources | 0x11 | In sufficient Resources to complete the request |
| Attribute Too Long | 0x12 | The attribute cannot be read or written using the Read Request |
| Attribute Too many | 0x13 | The attribute cannot be read or written due to more than one attribute |
| Invalid Attribute Value Type | 0x14 | The Type of Attribute value is invalid |
| Reserved | 0x15-0x7F | The attribute requires authorization before it can be read or write |
| Application Error | 0X80-0x9F | Too many prepare writes have been queued |
| Reserved | 0XA0-0xDF | No attribute found within the given attribute handle range |
| Common Profile and Service Error Codes | 0XE0-0xFF | |

At this time, since data size of the requested data is larger than the maximum transmission size of a read response, the server 110 sets the error code of the error response to "0x12" and transmits the error code to the client 120 together with the information of the read request.

The information of the read request can include opcode of the read request and/or request handle value.

The client 120 which has received the error response can know from the read response that the size of the requested characteristic value is larger than the maximum transmission size that can be transmitted through a read response.

Therefore, the client 120 transmits a read blob request to the server 110 to receive the characteristic value in segments S830. The read blob request includes the handle value of the attribute to receive and an offset value indicating the start position of the data to receive.

The read blob request can include the attribute handle value 0x0123 and an offset value 0x0000.

The server which has received the request transmits the characteristic value having the handle value of "0x0123", starting from "0x0000" to the value (in the present embodiment, "A Very Long Device Nam") corresponding to ATT_MTU-1 (to "0x0016"), to the client 120 through a read blob response S840.

Afterwards, the client transmits a read blob request including the handle value "0x0123" and an offset value "0x0016" to the server 110 to receive subsequent values S850.

The server 110 which has received the request transmits the data starting from the requested offset value to the value corresponding to ATT_MTU-1 (in the present embodiment, "e Using A Long Attribu") to the client 120 through a read blob response S860.

Since the client 120 has not received data of which the size is smaller than ATT_MTU-1 or a response having an invalid offset error code yet, the client 120 can know that there are still additional data to receive.

Therefore, the client 120 transmits a read blob request including a handle value "0x0123" and an offset value "0x002C" to the server 110, S870.

The server 110 which has received the request transmits the remaining data starting from the requested offset value (in the present embodiment, "te") to the client 120, S880, and since the client 120 receives data of which the size is smaller than ATT_MTU-1, the client 120 recognizes that there is no additional data to receive.

By using the method above, the client can know the size or length of data to receive and can receive all of the data with a long data length even when the server has transmitted a read response.

FIG. 9 illustrates one example of a method for transmitting data through a different response message according to the size of requested data, proposed in this specification.

With reference to FIG. 9, differently from FIG. 8, instead of using an error message, a server transmits data by using a different response message depending on the data size of requested data.

More specifically, in case the server 110 receives a data transmission request from the client 120, S910, the server 110 can find the data to transmit through a handle value included in the request message.

The server 110 which has found the requested data determines whether the data is larger than the maximum transmission size (ATT_MTU-1) that can be transmitted through a read response S920.

In case it is found from the determination result that the data size is larger than ATT_MTU-1, the server 110 transmits the data through a read blob response to transmit the data in segments S930.

However, in case the data size is smaller than ATT_MTU-1, the server 110 transmits the data to the client 120 through a read response S940.

FIG. 10 illustrates another example of a method for transmitting data through a different response message according to the size of requested data, proposed in this specification.

The method of FIG. 9 will be described with a specific example with reference to FIG. 10. The client 120 can transmit a read request to the server 110 to request characteristic values as shown in Table 3 stored in the server 110, S1010.

At this time, the read request has a handle value of "0x0123".

The server 100 can find the "A Very Long Device Name Using a Long Attribute" value by using the handle value, which is a requested characteristic value and determine whether the characteristic value is larger than the maximum transmission size (ATT_MTU-1).

At this time, in case the characteristic value is larger than ATT_MTU-1, the server 110 transmits the data "A Very Long Device Nam" corresponding to the size of ATT_MTU-1 to the client 120 through a read blob response S1020.

Receiving a read blob response in response to the read request, the client can know that there is additional data to receive.

Therefore, the client transmits a read blob request to the server 110 to receive additional data S1030. At this time, the read blob request can include a handle value, "0x0123", of the corresponding attribute and an offset value of the data to receive, "0x0016".

The server 110 which has received the read blob request transmits "e Using a Long Attribu" value corresponding to the maximum transmission size from the offset value, "0x0016", to the client 120 on the basis of the handle value to the client 120, S1040.

Since the client 120 has not received data of which the size is smaller than ATT_MTU-1 or a response having an invalid offset error code yet, the client 120 can know that there are still additional data to receive.

Therefore, the client 120 transmits a read blob request including a handle value "0x0123" and an offset value "0x002C" to the server 110, S1050.

The server 110 which has received the request transmits the remaining data, "te", starting from the requested offset value to the client 120, S1060, and since the client 120 receives data of which the size is smaller than ATT_MTU-1, the client 120 recognizes that there is no additional data to receive.

Therefore, the client requests no more data from the server 110.

FIG. 11 is a flow diagram illustrating another example of a method for obtaining data stored in a server, proposed in this specification.

With reference to FIG. 11, in case a client requests a characteristic value to read from a server by using the UUID of the characteristic value, and a plurality of characteristic values have the same UUID, the requested characteristic value can be received through a different UUID by transmitting an error message.

More specifically, the client can request the server 110 through a read by type request for the data which has a handle value ranging from "0x100" to "0x150" and a characteristic UUID "<<Temperature>>" S1110.

At this time, in case the server 110 stores the values as shown in Table 7 below, there can be a plurality of data, the UUID of which is "<<Temperature>>" between "0x100" and "0x150".

TABLE 7

| Attribute Handle | Attribute Type | Attribute Value | Attribute Permissions |
|---|---|---|---|
| 0x0122 | <<Characteristic>> | 0x02, 0x0123, <<Temperature>> | |
| 0x0123 | <<Temperature>> | 10° C. | |
| 0x0124 | <<Characteristic>> | 0x02, 0x0125, <<Temperature>> | |
| 0x0125 | <<Temperature>> | 25° C. | |

Therefore, the server 110 transmits an error response to the client 120 since there are a plurality of the same UUID S1120.

The error code value of the error response corresponds to "0x13" of Table 5 and includes the information of the read by type request.

The information of the read request can include the opcode of the read by type request and/or a requested handle value.

Through the error response, the client can know the existence of multiple data having the same UUID and transmit the read by type request again by changing the UUID to "<<Characteristic>>" S1130.

On the basis of the information, the server 110 searches for the data which has a handle value ranging from "0x100" to "0x150" and a characteristic UUID "<<Characteristic>>" as shown in FIG. 6.

As shown in Table 6, the data that can be found from the aforementioned information has a handle value ranging from "0x0122" to "0x0124".

Afterwards, the server 110 transmits the data found from the information to the client 120 through a read by type response S1140.

FIG. 12 is a flow diagram illustrating one example of a method for receiving a characteristic or UUID stored in a server, proposed in this specification.

With reference to FIG. 12, data stored in a server can be received not only through a handle value and an attribute type but also through an attribute value.

More specifically, the client 120 transmits a read by type value request to the server to read data stored in the server 110, S1210.

The read by type request is used to request data by using not only the UUID and handle value of the value stored in the server but also the attribute value thereof, which can employ a data format as shown in Table 8 below.

TABLE 8

| Parameter | Size | Description |
| --- | --- | --- |
| Attribute Opcode | 1 | 0x21 = Read Value By Type Reqeust |
| Starting Handle | 2 | First Requested handle number |
| Ending Handle | 2 | Last Requested handle number |
| Attribute Type | 2 | 2 octet UUID of Finding Attribute Type |
| Attribute Value | 0 to (ATT_MTU-7) | Attribute value to Find |

The attribute opcode has the value of "0x21" of Table 9 below.

TABLE 9

| Attribute PDU Name | Attribute Opcode | Parameters |
| --- | --- | --- |
| Read By Type Value Request | 0x21 | Starting Handle, Ending Handle, Attribute Type, Attribute Value |
| Read By Type Value Response | 0x22 | Length, Attribute Data |

The starting handle indicates the start of a range to which the attribute to find belongs, and the ending handle indicates the last handle to which the attribute to find belongs.

The attribute type represents the type of attribute (which can be specified by UUID) and has the following characteristics.

The attribute type can be specified in the form of an UUID.

When the attribute type is defined as <<Characteristic>>, information of the characteristic is searched for.

When the attribute type is defined as <<Characteristic Format>>, characteristic information in a specific format is searched for.

When the attribute type is defined as <<Characteristic User Description>>, characteristic information in a specific format is searched for.

Characteristic information to find is varied according to the type of attribute value.

The attribute value indicates the value of the data to find and has the format as shown in Table 10 below.

TABLE 10

| Data | Size(octet) | Description |
| --- | --- | --- |
| Value Type | 1 | Value Type 0x01 |
| Value | 2(if Value Type = 0x01) 4(if Value Type = 0x02) 16(if Value Type = 0x03) | |

TABLE 10-continued

| Data | Size(octet) | Description |
| --- | --- | --- |
| | 1 - (ATT_MTU-8)(if Value Type = 0x03) 1(if Value Type = 0x04) | |

The server 110 stores such values as shown in Table 6, and the read by type value request can include "<<Temperature>>" of which the starting handle is "0x100", ending handle is "0x150", attribute type is "<<Characteristic>>", value type of attribute value is "0x01", and value of attribute value is a 16 bit UUID.

The server 110 can find the corresponding value on the basis of the aforementioned value and transmit the corresponding value to the client 120 through a read by type value response S1220.

Table 11 below shows one example of the read by type value response format.

TABLE 11

| Parameter | Size(octets) | Description |
| --- | --- | --- |
| Attribute Opcode | 1 | 0x22 = Read Value By Type Response |
| Length | 1 | The size of each attribute handle value pair |
| Attribute Data List | 2 to (ATT_MTU-2) | A list of Attribute Data |

The opcode can have the value of '0x22' of Table 8. The Length represents length of attribute data that the read by type value response provides and is determined by attribute type and UUID value of a request message.

Since the attribute type included in the read by type value is a 16 bit UUID, the Length can use a 7-byte value.

The attribute data list indicates the structure of attribute data provided by the read by type value response.

Table 12 below illustrates one example of the format of the attribute data list.

TABLE 12

| Parameter | Size(octets) | Description |
| --- | --- | --- |
| Property | 1 | Characteristic Property |
| Handle | 2 | Characteristic Value Handle |
| Characteristic UUID | 2 or 16(or 4) | Characteristic UUID |

The Property represents a property value of the corresponding characteristic, and handle represents a handle value which stores a characteristic value.

In the present embodiment, the property can be "0x02", and the handle can be"0x0123".

The characteristic UUID returns a UUID value according to a Length value; in the present embodiment, the characteristic UUID can return "<<Temperature>>".

Since the handle received from the server 110 is "0x0123", the client 120 which has received the read by type value response transmits a read by type value request to the server 110 afterwards to check whether a characteristic having the same characteristic UUID exists S1230.

At this time, the read by type value request can include "<<Temperature>>" of which the starting handle is "0x124", ending handle is "0x150", attribute type is "<<Characteristic>>", value type of attribute value is "0x01", and value of attribute value is a 16 bit UUID.

In case no additional characteristic UUID exists, the server 110 transmits an error response to the client 120, S1240, and the client 120 receiving the error response figures out that no further search is needed.

In another embodiment of the present invention, in case the client wants to find data by using a characteristic value, the client can transmit the read by type value request by setting the value type of attribute value as "0x04" and value of attribute value as a characteristic value of "10° C.".

In this case, the server 110 can find a stored value on the basis of the value included in the read by type value request and transmits the found value to the client 120 through the read by type value response.

At this time, the read by type value response includes the following values: Length is "0x07"; Property is "0x02"; Handle is "0x0123", and characteristic UUID is "<<Temperature>>".

Afterwards, since the received handle is "0x0123", the client transmits a read by type value request to check whether a characteristic having the same characteristic UUID exists subsequently.

In case there is no additional characteristic UUID, the server 110 transmits an error response to the client 120, and the client recognizes that no further search is required.

FIG. 13 is a flow diagram illustrating one example of a method for transmitting an error message in case requested data does not exist, proposed in this specification.

With reference to FIG. 13, in case data corresponding to the value requested by a client does not exist, a server can inform the client of the aforementioned fact by transmitting an error message.

More specifically, the client can request data of which the starting handle is "0x100", ending handle is "0x150", and attribute type is "0x06" through the read by type value request described with reference to FIG. 12, S1310.

The server 110 which has received the request can find a stored value on the basis of the value included in the read by type value request. However, as shown in Table 6, the data of which attribute type is "0x06" is not stored therein.

Therefore, the server 110 transmits an error response including the information (read by type request, 0x0123) included in the read by type value request to the client S1320 since the requested data does not exist. At this time, the opcode of the error response includes "0x14" which indicates the invalid attribute value type error code of Table 5.

FIGS. 14 and 15 illustrate a method for receiving data size or length information stored in a server or an attribute structure, proposed in this specification.

With reference to FIG. 14, the client 120 can transmit a read attribute length request to the sever 110 to request information about data size or length of the data stored in the server 110, S1410.

Table 13 below shows one example of a data format of the read attribute length request.

TABLE 13

| Parameter | Size(octets) | Description |
| --- | --- | --- |
| Attribute Opcode | 1 | 0x21 = Read Attribute Length Request |
| Attribute Handle | 2 | Handle Number of Attribute |

The attribute opcode can have the value of "0x21" shown in Table 13 below, and the attribute handle indicates the handle value at which the corresponding attribute can be found.

Table 14 below shows one example of the opcode of a read attribute length request and a read attribute length response.

TABLE 14

| Attribute PDU Name | Attribute Opcode | Parameters |
| --- | --- | --- |
| Read Attribute Length Request | 0x21 | Attribute Handle |
| Read Attribute Length Response | 0x22 | Attribute Length |

The server 110 can find the corresponding attribute by using the handle value included in the request made by the client 120 and transmits the length value of the corresponding attribute to the client by including the length value in a read attribute length response S1420.

Table 15 below shows one example of a format of the read attribute length response.

TABLE 15

| Parameter | Size(octets) | Description |
| --- | --- | --- |
| Attribute Opcode | 1 | 0x22 = read Attribute Length Response |
| Length | 2 | The size of each attribute value |

The attribute opcode include the value of "0x22" which indicates the read attribute length response of Table 14, and the length represents the Length of the corresponding attribute.

For example, if the server 110 stores such values as shown in Table 16 below, and the client request the attribute length of which the handle value is "0x0123", the server 110 can transmit "0x05" to the client 120.

TABLE 16

| Attribute Handle | Attribute Type | Attribute Value | Attribute Permissions |
| --- | --- | --- | --- |
| 0x0122 | <<Characteristic>> | 0x02, 0x0123, <<Name>> | |
| 0x0123 | <<Name>> | Jingu | |

By using the method above, the client can request length information of a specific attribute value from the server and determine on the basis of length information of each attribute which type of request to transmit to the server.

In other words, in case the length is shorter than the maximum transmission size, the client can transmit a read request or write request to the server 110 and receive the corresponding value on the basis of length information of the attribute value.

However, in case the length is larger than the maximum transmission size, data has to be received in segments from the server 110; thus the client can receive the corresponding value by transmitting a read blob request to the server 110.

Also, since the client 120 is aware of the length of the attribute value correctly, the scheme above also brings an advantageous effect of figuring out the existence of additional data correctly.

FIG. 15 illustrates a case in which a server 110 is storing length information of the attribute. In other words, as shown in FIG. 15, the server 110 can store length value of the attribute in the Attribute Value Length.

Therefore, in the event of a request from the client 120, the server 110 can provide the length value of the corresponding attribute value, and the client 120 can transmit a read request or read blob request to the server 110 correctly on the basis of the length value.

Table 17 below shows one example of Logical Attribute Representation shown in FIG. 15.

TABLE 17

| Attribute Handle | Attribute Type | Attribute Value | Attribute Value Length | Attribute Permissions |
|---|---|---|---|---|
| 0x0122 | <<Characteristic>> | 0x02, 0x0123, <<Name>> | 0x05(in the case of 16 bit UUID) 0x13(in the case of 128 bit UUID) | |
| 0x0123 | <<Name>> | Jingu | 0x05 | |

As described above, the server 110 can manage the length of the corresponding value by adding Attribute Value Length field to the Attribute Representation.

Also, in the event of a request from the client 120, the server 110 can transmit length information of the corresponding value to the client 120 through a response.

FIG. 16 is a flow diagram illustrating one example of a method for notifying a client of data stored in a server, proposed in this specification.

With reference to FIG. 16, in case size of the data of which the server attempts to notify the client is large, the server can transmit the data through multiple notifications.

More specifically, in case the size of the attribute value that the server 110 wants to transmit to the client is larger than the maximum transmission size ATT_MTU-3, data can be transmitted through blob handle value notification.

Table 18 below shows one example of a format of the blob handle value notification.

TABLE 18

| Parameter | Size(octet) | Description |
|---|---|---|
| Attribute Opcode | 1 | |
| Attribute Handle | 2 | Handle Number of Attribute |
| Part Attribute Value | 0 - ATT_MTU-5 | Part of the value of the attribute |
| offset | 2 | Offset of the attribute value to be read |

The opcode can have the value of "0x22" indicating blob handle value notification of Table 19 below, and the attribute handle represents the handle value at which the corresponding attribute can be found.

The part attribute value represents part of the attribute value transmitted through the notification.

The offset represents the offset value of a first value of the attribute value that is actually provided.

TABLE 19

| Attribute PDU Name | Attribute Opcode | Parameter |
|---|---|---|
| Blob Handle Value Notification | 0x22 | Attribute Handle, Part Attribute Value, Offset |

TABLE 19-continued

| Attribute PDU Name | Attribute Opcode | Parameter |
|---|---|---|
| Blob Handle Value Indication | 0x23 | Attribute Handle, Part Attribute Value, Offset |
| Blob Handle Value Confirmation | 0x24 | Attribute Handle, Offset |

For example, in case the server 110 transmits the data of Table 4 to the client 120, since the length of "A Very Long Device Name Using a Long Attribute" value of Table 3 is longer than ATT_MTU-3, it cannot be transmitted to the client through one transmission.

Therefore, the server 110 transmits data amounting up to ATT_MTU-3 to the client 120 through the blob handle value notification S1610.

At this time, the attribute handle can have the value of "0x0123", part attribute value can have the value of "A Very Long Device Nam", and OFFSet can have the value of "0x00".

Afterwards, to transmit additionally the data left from the S1610 step to the client 120, the server 110 transmits blob handle value notification again to the client 120, S1620.

At this time, the attribute handle can have the value of "0x0123", part attribute value can have the value of "e Using a Long Attribu", and the OFFSet can have the value of "0x0016".

The server 110, which has not finished transmitting the whole data even through the S1520 yet, transmits blob handle value notification again to the client 120 to transmit the remaining data to the client 120, S1630.

At this time, the attribute handle can have the value of "0x0123", part attribute value can have the value of "te", and the OFFSet can have the value of "0x002C".

In case the amount of data transmitted is not the maximum transmission size that can be transmitted by the corresponding message or no additional transmission is performed for more than a predetermined time period, the client 120 which has received the blob handle value notification can conclude that transmission of data having the corresponding attribute has been completed.

FIG. 17 is a flow diagram illustrating another example of a method for notifying a client of data stored in a server, proposed in this specification.

With reference to FIG. 17, if a client which has received data through notification determines that there is additional data to receive, the client can receive the additional data by requesting the server to transmit additional data.

More specifically, in case the server 110 transmits data through blob handle value notification as described with reference to FIG. 16, the client 120 can recognize that the attribute value cannot be received in one transmission because of the long length of the attribute value.

Afterwards, the client 120 can request an additional data request from the server 110 by transmitting the read blob request described above, and the server 110 can transmit additional data by transmitting a read blob response to the client 120 in response to the request.

For example, in case the server 110 attempts to transmit "A Very Long Device Name Using a Long Attribute" of Table 4, it is not possible to transmit the aforementioned attribute value through one PDU.

Therefore, the server 110 transmits data amounting up to ATT_MTU-3 to the client 120 through the blob handle value notification S1710.

At this time, the attribute handle can have the value of "0x0123", part attribute value can have the value of "A Very Long Device Nam", and the OFFSet can have the value of "0x00".

The client 120 can determine whether additional data exists in the server 110 on the basis of the fact that the data has been transmitted through the blob handle value notification or the data length information transmitted or known to the client.

In case there is additional data to receive, the client 120 transmits a read blob request to the server 110, S1720.

Afterwards, since the S1730 to S1750 steps are the same as the S860 to S880 steps of FIG. 8 or S1040 to S1060 steps of FIG. 10, the corresponding descriptions will be omitted.

FIG. 18 is a flow diagram illustrating one example of a method for indicating data stored in a server to a client, proposed in this specification.

Differently from FIG. 16, FIG. 18 describes a method that can be used to transmit data stored in the server 110 to the client 120 through indication, and the client 120 receiving the data can inform the server 110 of the reception of the data through confirmation.

More specifically, in case size of the attribute value that the server 110 attempts to transmit to the client is larger than ATT_MTU-3, which is the maximum transmission size, the server 110 can transmit data through blob handle value indication.

The format of the blob handle value indication is the same as the format of the blob handle value notification. At this time, the value of attribute opcode has the value of "0x23" which indicates the blob handle value indication.

The client 120 which has received data from the server 110 through the blob handle value indication can transmit blob handle value confirmation to the server 110 in response to the reception of the data.

Table 20 below shows one example of a format of the blob handle value confirmation.

TABLE 20

| Parameter | Size(octet) | Description |
| --- | --- | --- |
| Attribute Opcode | 1 | |
| Attribute Handle | 2 | Handle Number of Attribute |
| Offset | 2 | Offset of the attribute value to be read |

The attribute opcode can include the value of "0x24" which indicates blob handle value confirmation shown in Table 19.

For example, in case the server 110 transmits the data of Table 4 to the client 120, the length of "A Very Long Device Name Using a Long Attribute" value shown in Table 3 is larger than ATT_MTU-3, it is not possible to transmit the data to the client 120 in one transmission.

Therefore, the server 110 transmits data amounting up to ATT_MTU-3 to the client 120 through the blob handle value indication S1810.

At this time, the attribute handle can have the value of "0x0123", part attribute value can have the value of "A Very Long Device Nam", and the OFFSet can have the value of "0x00".

The client 120 which has received data from the server 110 transmits blob handle value confirmation to the server 110 in response to the reception of the data S1820.

At this time, the attribute handle can have the value of "0x0123", and the OFFSet can have the value of "0x0016" which represents the information about the amount of data received.

Afterwards, to transmit additionally the data left from the S1710 step to the client 120, the server 110 transmits blob handle value indication again to the client 120, S1830.

At this time, the attribute handle can have the value of "0x0123", part attribute value can have the value of "e Using a Long Attribu", and the OFFSet can have the value of "0x0016".

The client 120 transmits again the blob handle value confirmation to the server 110 in response to the aforementioned indication S1840.

At this time, the attribute handle can have the value of "0x0123", and the OFFSet can have the value of "0x002C" which represents the information about the amount of data received.

To transmit the data still left from the S1730 step to the client 120, the server 110 transmits blob handle value indication again to the client 120, S1850.

At this time, the attribute handle can have the value of "0x0123", part attribute value can have the value of "te", and the OFFSet can have the value of "0x002C".

The client 120 transmits the blob handle value confirmation again to the server 110 in response to the aforementioned indication S1860.

At this time, the attribute handle can have the value of "0x0123", and the OFFSet can have the value of "0x002E" which represents the information about the amount of data received.

In case the amount of data transmitted is not the maximum transmission size that can be transmitted by the corresponding message or no additional transmission is performed for more than a predetermined time period, the client 120 which has received the blob handle value indication can conclude that transmission of data having the corresponding attribute has been completed.

FIG. 19 is a flow diagram illustrating another example of a method for indicating data stored in a server to a client, proposed in this specification.

With reference to FIG. 19, if the client which has received data through indication determines that there exists additional data to receive, the client can receive the additional data by requesting the server to transmit the additional data.

More specifically, in case the server 110 transmits data through blob handle value indication described with reference to FIG. 18, the client 120 can recognize that the attribute value cannot be received in one transmission because of the long length of the attribute value.

Afterwards, the client 120 can request an additional data request from the server 110 by transmitting the read blob request described above, and the server 110 can transmit additional data by transmitting a read blob response to the client 120 in response to the request.

For example, in case the server 110 attempts to transmit "A Very Long Device Name Using a Long Attribute" of Table 4, it is not possible to transmit the aforementioned attribute value through one message.

Therefore, the server 110 transmits data amounting up to ATT_MTU-3 to the client 120 through the blob handle value indication S1910.

At this time, the attribute handle can have the value of "0x0123", part attribute value can have the value of "A Very Long Device Nam", and the OFFSet can have the value of "0x00".

The client 120 which has received data from the server 110 transmits blob handle value confirmation to the server 110 in response to the reception of the data S1820.

At this time, the attribute handle can have the value of "0x0123", and the OFFSet can have the value of "0x0016" which represents the information about the amount of data received.

The client 120 can determine whether additional data exists in the server 110 on the basis of the fact that the data has been transmitted through the blob handle value indication or the data length information transmitted or known to the client.

In case there is additional data to receive, the client 120 transmits a read blob request to the server 110, S1920.

Afterwards, since the S1940 to S1960 steps are the same as the S860 to S880 steps of FIG. 8 or S1040 to S1060 steps of FIG. 10, the corresponding descriptions will be omitted.

FIGS. 20 to 23 are flow diagrams illustrating one example of an error occurring when data are stored in a server, proposed in this specification.

With reference to FIGS. 20 to 23, in case the client 120 stores data in the server 110, an error can occur as data size or type is specified incorrectly.

More specifically, in case the client 120 attempts to store data in the server 110, the client 120 can store the data by transmitting a write request to the server 110.

At this time, the write request includes data value to be stored and a handle value corresponding to the data value.

However, in case the type, format, size, or range of the value to be stored through the write request is specified incorrectly, the server 110 transmits an error response to the client.

The error response has the same format as shown in Table 5.

Table 21 shows one example of error codes used in the error response.

TABLE 21

| Name | Error Code | Description |
| --- | --- | --- |
| Invalid Handle | 0x01 | The Attribute Handle given was not valid on this server |
| Read Not Permitted | 0x02 | The attribute cannot be read |
| Write Not Permitted | 0x03 | The attribute cannot be written |
| Invalid PDU | 0x04 | The attribute PDU was invalid |
| Insufficient Authentication | 0x05 | The attribute requires authentication before it can be read or written |
| Request Not Supported | 0x06 | Attribute server does not support the request received from the client |
| Invalid Offset | 0x07 | Offset specified was past the end of the attribute |
| Insufficient Authorization | 0x08 | The attribute requires authorization before it can be read or write |
| Prepare Queue Full | 0x09 | Too many prepare writes have been queued |
| Attribute Not Found | 0x0A | No attribute found within the given attribute handle range |
| Attribute Not Long | 0x0B | The attribute cannot be read or written using the Read Blob Request |
| Insufficient Encryption Key Size | 0x0C | The Encryption Key Size Used for encryption this link is insufficient |
| Invalid Attribute Value Length | 0x0D | The attribute value length is invalid for the operation |
| Unlikely Error | 0x0E | The attribute request that was requested has encountered an error that was unlikely, and therefore could not be completed as requested |
| Insufficient Encryption | 0x0F | The attribute requires Encryption before it can be read or written |
| Unsupported Group Type | 0x10 | The attribute type is not a supported grouping attribute as defined by a higher layer specification |
| Insufficient Resources | 0x11 | In sufficient Resources to complete the request |
| Invalid Format(Data Type) | 0x12 | The format(type) of attribute value is incorrect. |
| Invalid Value | 0x13 | The value of attribute is incorrect |
| Invalid Value due to more than Maximum | 0x14 | The value of attribute is incorrect because it exceeds the maximum value |
| Invalid Value due to more than Minimum | 0x15 | The value of attribute is incorrect because it is less or fewer than the minimum value |
| Reserved | 0x16-0x7F | The attribute requires authorization before it can be read or write |
| Application Error | 0X80-0x9F | Too many prepare writes have been queued |
| Reserved | 0XA0-0xDF | No attribute found within the given attribute handle range |
| Common Profile and Service Error Codes | 0XE0-0xFF | |

FIG. 20 illustrates a case in which the type or format of a value is specified incorrectly; the client 120 requests storing a (integer) value of "0x033" at the position where the handle value is "0x123" through the write request S2010.

However, in case data with "string" data type is stored in the value of the attribute positioned at the handle value, the server 110 transmits an error response to the client 120 since the data type or format of the data to be stored does not match the specified data type or format S2020.

At this time, the error response can include the error code "0x12" and/or information of the read request.

The information of the read request can include the opcode of the read request and/or the requested handle value.

FIG. 21 illustrates a case in which the range of a value is specified incorrectly; the client 120 requests storing a (integer) value of "0x033" at the position where the handle value is "0x123" through the write request S2110.

However, in case data with "string" data type is stored in the value of the attribute positioned at the handle value, the server 110 transmits an error response to the client 120 since the range of the data to be stored does not match the specified data range S2120.

At this time, the error response can include the error code "0x13" and/or information of the read request.

The information of the read request can include the opcode of the read request and/or the requested handle value.

FIG. 22 illustrates a case in which a value exceeds the maximum value that can be stored; the client 120 requests storing a (integer) value of "0x78" (120 in decimal number) at the position where the handle value is "0x123" through the write request S2210.

However, in case the value of the attribute positioned at the handle value stores temperature of water as shown in Table 22, the valid range of the value is from 0° C. to 100° C.

Therefore, since the requested value exceeds the maximum value that can be stored, the server 110 transmits an error response to the client 120, S2220.

TABLE 22

| Attribute Handle | Attribute Type | Attribute Value | Attribute Permission |
|---|---|---|---|
| 0x0122 | <<Characteristic>> | 0x02, 0x0123, <<Temperature>> | |
| 0x0123 | <<Temperature>> | 10° C. | |

At this time, the error response can include the error code "0x14" and/or information of the read request.

The information of the read request can include the opcode of the read request and/or the requested handle value.

FIG. 22 illustrates a case in which a value exceeds the minimum value that can be stored; the client 120 requests storing a (integer) value of "−0x20" (−32 in decimal number) at the position where the handle value is "0x123" through the write request S2310.

However, in case the value of the attribute positioned at the handle value stores temperature of water as shown in Table 22, the valid range of a value is from 0° C. to 100° C.

Therefore, since the requested value exceeds the minimum value 0 that can be stored, the server 110 transmits an error response to the client 120, S2220.

At this time, the error response can include the error code "0x15" and/or information of the read request.

The information of the read request can include the opcode of the read request and/or the requested handle value.

Various substitutions, modifications, and changes can be made to the present invention described above by those skilled in the art to which the present invention belongs without leaving the technical scope of the present invention; therefore, the present invention is not limited to the embodiments above and appended drawings.

The invention claimed is:

1. A method for transmitting and receiving data through Bluetooth Low Energy (BLE) in a wireless communication system, the method performed by a first device and comprising:
   transmitting a first request message requesting first length information of an attribute value of a specific characteristic;
   receiving a first response message including the first length information;
   transmitting a second request message requesting the attribute value,
   wherein the second request message includes a handle value indicating a position where the attribute value of the specific characteristic is stored, and
   wherein a type of the second request message is determined based on the first length information;
   receiving a second response message including data of the attribute value;
   transmitting a third request message requesting transmission of additional data of the attribute value to a second device, when the additional data is recognized as being a part of the attribute value,
   wherein the third request message includes the handle value and an offset value indicating a start position of the additional data of the attribute value; and
   receiving a third response message including the additional data,
   wherein the second request message or the third request message includes at least one of identification (ID) information, index information, or index range information of the attribute value, and
   wherein the second response message or the third response message includes at least one of second length information or the ID information.

2. The method of claim 1, further comprising:
   receiving an error message from the second device, when multiple data associated with same ID information exists;
   transmitting a fourth request message requesting transmission of corrected data; and
   receiving a fourth response message including the corrected data in response to the fourth request message.

3. The method of claim 1, wherein the first device recognizes that the additional data is part of the attribute value if an octet of the additional data is equal to Attribute protocol (ATT) Maximum Transmission Unit (MTU) 1 (ATT_MTU-1) indicating an octet of a longest attribute value transmitted in one packet.

4. A first device for transmitting and receiving data through Bluetooth Low Energy (BLE) in a wireless communication system, the first device comprising:
   a transceiver configured to transmit and receive a signal; and
   a controller functionally connected to the transceiver,
   wherein the controller is configured to:
      control the transceiver to transmit a first request message requesting first length information of an attribute value of a specific characteristic,
      control the transceiver to receive a first response message including the first length information,
      control the transceiver to transmit a second request message requesting the attribute value,
      wherein the second request message includes a handle value indicating a position where the attribute value of the specific characteristic is stored, and
      wherein a type of the second request message is determined based on the first length information,
      control the transceiver to receive a second response message including data of the attribute value,
      control the transceiver to transmit a third request message requesting transmission of additional data of the attribute value to a second device, when the additional data is recognized as being a part of the attribute value,
      wherein the third request message includes the handle value and an offset value indicating a start position of the additional data of the attribute value, and
      control the transceiver to receive a third response message including the additional data,
      wherein the second request message or the third request message includes at least one of identification (ID) information, index information, or index range information of the attribute value, and
      wherein the second response message or the third response message includes at least one of second length information or the ID information.

5. The first device of claim 4, wherein the controller is further configured to:
   control the transceiver to receive an error message from the second device, when multiple data associated with same ID information exists,
   control the transceiver to transmit a fourth request message requesting transmission of corrected data, and control the transceiver to receive a fourth response message including the corrected data in response to the fourth request message.

\* \* \* \* \*